United States Patent
Wyld

(10) Patent No.: US 7,913,297 B2
(45) Date of Patent: Mar. 22, 2011

(54) PAIRING OF WIRELESS DEVICES USING A WIRED MEDIUM

(75) Inventor: Jeremy Wyld, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1222 days.

(21) Appl. No.: 11/513,692

(22) Filed: Aug. 30, 2006

(65) Prior Publication Data

US 2008/0070501 A1 Mar. 20, 2008

(51) Int. Cl.
G06F 7/04 (2006.01)
G06F 15/16 (2006.01)

(52) U.S. Cl. .......................................................... 726/5
(58) Field of Classification Search ................. 726/5
See application file for complete search history.

(56) References Cited

U.S. PATENT DOCUMENTS

| | | |
|---|---|---|
| 3,612,265 A | 10/1971 | Dickerson |
| 3,807,388 A | 4/1974 | Orr et al. |
| 3,918,058 A | 11/1975 | Noyori et al. |
| 3,958,459 A | 5/1976 | Shimomura |
| 3,978,725 A | 9/1976 | Haditke |
| 4,089,057 A | 5/1978 | Eriksson |
| 4,090,216 A | 5/1978 | Constable |
| 4,101,873 A | 7/1978 | Anderson et al. |
| 4,114,450 A | 9/1978 | Shulmann et al. |
| 4,195,642 A | 4/1980 | Price et al. |
| 4,210,024 A | 7/1980 | Ishiwatari et al. |
| 4,223,211 A | 9/1980 | Allsen et al. |
| 4,248,244 A | 2/1981 | Charnitski et al. |
| 4,317,126 A | 2/1982 | Gragg, Jr. |
| 4,371,188 A | 2/1983 | Hull |
| 4,371,945 A | 2/1983 | Karr et al. |
| 4,375,674 A | 3/1983 | Thornton |
| 4,386,345 A | 5/1983 | Narveson et al. |
| 4,423,630 A | 1/1984 | Morrison |
| 4,434,801 A | 3/1984 | Jiminez et al. |
| 4,451,849 A | 5/1984 | Fuhrer |
| 4,516,110 A | 5/1985 | Overmyer |
| 4,516,865 A | 5/1985 | Hideo |
| 4,578,769 A | 3/1986 | Frederick |
| 4,589,022 A | 5/1986 | Prince et al. |
| 4,625,733 A | 12/1986 | Saynajakangas |
| 4,694,694 A | 9/1987 | Vlakancic et al. |
| 4,699,379 A | 10/1987 | Chateau et al. |

(Continued)

FOREIGN PATENT DOCUMENTS

DE 43 34 773 A1 4/1994

(Continued)

OTHER PUBLICATIONS

Bisdikian, Chatschik. "An Overview of the Bluetooth Wireless Technology", Jun. 2001.*

(Continued)

Primary Examiner — Michael J Simitoski
(74) Attorney, Agent, or Firm — Beyer Law Group LLP

(57) ABSTRACT

Techniques that facilitate pairing of wireless devices with other wireless devices are disclosed. According to one aspect, a pair of wireless devices can be paired for wireless data exchange using an available wired link. Advantageously, the wired link can be used to transport a pin code from one of the wireless devices to the other. Consequently, pairing of the wireless devices can be completed without necessitating user entry of a pin code so long as the wired link is available.

22 Claims, 8 Drawing Sheets

U.S. PATENT DOCUMENTS

| | | |
|---|---|---|
| 4,703,445 A | 10/1987 | Dassler |
| 4,720,093 A | 1/1988 | Del Mar |
| 4,722,222 A | 2/1988 | Purdy et al. |
| 4,736,312 A | 4/1988 | Dassler et al. |
| 4,745,564 A | 5/1988 | Tennes et al. |
| 4,757,453 A | 7/1988 | Nasiff |
| 4,757,714 A | 7/1988 | Purdy et al. |
| 4,759,219 A | 7/1988 | Cobb et al. |
| 4,763,275 A | 8/1988 | Carlin |
| 4,763,284 A | 8/1988 | Carlin |
| 4,763,287 A | 8/1988 | Gerhaeuser et al. |
| 4,771,394 A | 9/1988 | Cavanagh |
| 4,774,679 A | 9/1988 | Carlin |
| 4,775,948 A | 10/1988 | Dial et al. |
| 4,780,837 A | 10/1988 | Namekawa |
| 4,821,218 A | 4/1989 | Potsch |
| 4,822,042 A | 4/1989 | Landsman |
| 4,824,107 A | 4/1989 | French |
| 4,829,812 A | 5/1989 | Parks et al. |
| 4,830,021 A | 5/1989 | Thornton |
| 4,862,394 A | 8/1989 | Thompson et al. |
| 4,862,395 A | 8/1989 | Fey et al. |
| 4,873,867 A | 10/1989 | McPherson et al. |
| 4,876,500 A | 10/1989 | Wu |
| 4,883,271 A | 11/1989 | French |
| 4,903,212 A | 2/1990 | Yokouchi et al. |
| 4,908,523 A | 3/1990 | Snowden et al. |
| 4,928,307 A | 5/1990 | Lynn |
| 4,935,887 A | 6/1990 | Abdalah et al. |
| 4,951,171 A | 8/1990 | Tran et al. |
| 4,955,980 A | 9/1990 | Masuo |
| 5,033,013 A | 7/1991 | Kato et al. |
| 5,036,467 A | 7/1991 | Blackburn et al. |
| 5,056,783 A | 10/1991 | Matcovich et al. |
| 5,067,081 A | 11/1991 | Person |
| 5,088,836 A | 2/1992 | Yameda et al. |
| 5,117,444 A | 5/1992 | Sutton et al. |
| 5,144,226 A | 9/1992 | Rapp |
| 5,148,002 A | 9/1992 | Kuo et al. |
| 5,150,310 A | 9/1992 | Greenspun et al. |
| 5,162,828 A | 11/1992 | Furness et al. |
| 5,181,181 A | 1/1993 | Glynn |
| 5,200,827 A | 4/1993 | Hanson et al. |
| 5,243,993 A | 9/1993 | Alexander et al. |
| 5,258,927 A | 11/1993 | Havriluk et al. |
| 5,295,085 A | 3/1994 | Hoffacker |
| 5,316,249 A | 5/1994 | Anderson |
| 5,324,038 A | 6/1994 | Sasser |
| 5,335,664 A | 8/1994 | Nagashima |
| 5,339,699 A | 8/1994 | Carignan |
| 5,343,445 A | 8/1994 | Cherdak |
| 5,348,519 A | 9/1994 | Prince et al. |
| 5,382,972 A | 1/1995 | Kannes |
| 5,396,429 A | 3/1995 | Hanchett |
| 5,406,305 A | 4/1995 | Shimomura et al. |
| 5,420,828 A | 5/1995 | Geiger |
| 5,426,595 A | 6/1995 | Picard |
| 5,436,838 A | 7/1995 | Miyamori |
| 5,446,775 A | 8/1995 | Wright et al. |
| 5,450,329 A | 9/1995 | Tanner |
| 5,452,269 A | 9/1995 | Cherdak |
| 5,471,405 A | 11/1995 | Marsh |
| 5,475,725 A | 12/1995 | Nakamura |
| 5,476,427 A | 12/1995 | Fujima |
| 5,485,402 A | 1/1996 | Smith et al. |
| 5,486,815 A | 1/1996 | Wagner |
| 5,487,006 A | 1/1996 | Kakizaki et al. |
| 5,509,082 A | 4/1996 | Toyama et al. |
| 5,513,854 A | 5/1996 | Daver |
| 5,524,637 A | 6/1996 | Erickson |
| 5,526,326 A | 6/1996 | Fekete et al. |
| 5,528,228 A | 6/1996 | Wilk |
| 5,539,336 A | 7/1996 | Nguyen et al. |
| 5,541,604 A | 7/1996 | Meier |
| 5,546,307 A | 8/1996 | Mazur et al. |
| 5,546,974 A | 8/1996 | Bireley |
| 5,559,945 A | 9/1996 | Beaudet et al. |
| 5,564,698 A | 10/1996 | Honey et al. |
| 5,574,669 A | 11/1996 | Marshall |
| 5,583,776 A | 12/1996 | Levi et al. |
| 5,583,993 A | 12/1996 | Foster et al. |
| 5,590,908 A | 1/1997 | Carr |
| 5,592,401 A | 1/1997 | Kramer |
| 5,605,336 A | 2/1997 | Gaoiran et al. |
| 5,608,698 A | 3/1997 | Yamanoi et al. |
| 5,615,132 A | 3/1997 | Horton et al. |
| 5,616,876 A | 4/1997 | Cluts |
| 5,617,084 A | 4/1997 | Sears |
| 5,617,386 A | 4/1997 | Choi |
| 5,618,995 A | 4/1997 | Otto et al. |
| 5,627,548 A | 5/1997 | Woo et al. |
| 5,629,131 A | 5/1997 | De Keyzer et al. |
| 5,633,070 A | 5/1997 | Murayama et al. |
| 5,636,146 A | 6/1997 | Flentov et al. |
| 5,646,857 A | 7/1997 | McBurney et al. |
| 5,670,985 A | 9/1997 | Cappels, Sr. et al. |
| 5,671,010 A | 9/1997 | Shimbo et al. |
| 5,671,162 A | 9/1997 | Werbin |
| 5,673,691 A | 10/1997 | Abrams et al. |
| 5,680,102 A | 10/1997 | Xydis |
| 5,684,513 A | 11/1997 | Decker |
| 5,688,183 A | 11/1997 | Sabatino et al. |
| 5,690,119 A | 11/1997 | Rytky et al. |
| 5,690,591 A | 11/1997 | Kenmochi et al. |
| 5,690,773 A | 11/1997 | Fidalgo et al. |
| 5,694,340 A | 12/1997 | Kim |
| 5,701,257 A | 12/1997 | Miura et al. |
| 5,710,922 A | 1/1998 | Alley et al. |
| 5,712,638 A | 1/1998 | Issa |
| 5,712,949 A | 1/1998 | Kato et al. |
| 5,720,200 A | 2/1998 | Anderson et al. |
| 5,721,539 A | 2/1998 | Goetzi |
| 5,721,949 A | 2/1998 | Smith et al. |
| 5,723,786 A | 3/1998 | Klapman |
| 5,724,265 A | 3/1998 | Hutchings |
| 5,726,672 A | 3/1998 | Hernandez et al. |
| 5,734,337 A | 3/1998 | Kupersmit |
| 5,738,104 A | 4/1998 | Lo et al. |
| 5,739,451 A | 4/1998 | Winksy et al. |
| 5,740,143 A | 4/1998 | Suetomi |
| 5,743,269 A | 4/1998 | Okigami et al. |
| 5,745,037 A | 4/1998 | Guthrie et al. |
| 5,749,615 A | 5/1998 | Itson |
| 5,761,096 A | 6/1998 | Zakutin |
| 5,771,485 A | 6/1998 | Echigo |
| 5,779,576 A | 7/1998 | Smith, III et al. |
| 5,781,155 A | 7/1998 | Woo et al. |
| 5,790,477 A | 8/1998 | Hauke |
| 5,807,284 A | 9/1998 | Foxlin |
| 5,812,056 A | 9/1998 | Law |
| 5,815,225 A | 9/1998 | Nelson |
| 5,822,288 A | 10/1998 | Shinada |
| 5,835,721 A | 11/1998 | Donahue et al. |
| 5,835,732 A | 11/1998 | Kikinis et al. |
| 5,862,803 A | 1/1999 | Besson et al. |
| 5,864,868 A | 1/1999 | Contois |
| 5,870,710 A | 2/1999 | Ozawa et al. |
| 5,886,739 A | 3/1999 | Winningstad |
| 5,891,042 A | 4/1999 | Sham et al. |
| 5,895,073 A | 4/1999 | Moore |
| 5,897,457 A | 4/1999 | Mackovjak |
| 5,899,963 A | 5/1999 | Hutchings |
| 5,901,303 A | 5/1999 | Chew |
| 5,905,460 A | 5/1999 | Odagiri et al. |
| 5,918,281 A | 6/1999 | Nabulsi |
| 5,918,303 A | 6/1999 | Yamaura et al. |
| 5,920,728 A | 7/1999 | Hallowell et al. |
| 5,923,757 A | 7/1999 | Hocker et al. |
| 5,925,001 A | 7/1999 | Hoyt et al. |
| 5,929,335 A | 7/1999 | Carter |
| 5,930,741 A | 7/1999 | Kramer |
| 5,936,523 A | 8/1999 | West |
| 5,946,643 A | 8/1999 | Zakutin |
| 5,947,917 A | 9/1999 | Carte et al. |
| 5,952,992 A | 9/1999 | Helms |
| 5,955,667 A | 9/1999 | Fyfe |
| 5,959,568 A | 9/1999 | Wooley |

| | | | |
|---|---|---|---|
| 5,960,380 A | 9/1999 | Flentov et al. | |
| 5,963,523 A | 10/1999 | Kayama et al. | |
| 5,963,891 A | 10/1999 | Walker et al. | |
| 5,976,083 A | 11/1999 | Richardson et al. | |
| 5,977,877 A | 11/1999 | McCulloch et al. | |
| 5,978,972 A | 11/1999 | Stewart et al. | |
| 5,984,842 A | 11/1999 | Chu | |
| 6,002,982 A | 12/1999 | Fry | |
| 6,006,274 A | 12/1999 | Hawkins et al. | |
| 6,009,237 A | 12/1999 | Hirabayashi et al. | |
| 6,009,629 A | 1/2000 | Gnepf et al. | |
| 6,011,491 A | 1/2000 | Goetzi | |
| 6,011,585 A | 1/2000 | Anderson | |
| 6,013,007 A | 1/2000 | Root et al. | |
| 6,018,677 A | 1/2000 | Vidrine et al. | |
| 6,018,705 A | 1/2000 | Gaudet et al. | |
| 6,020,851 A | 2/2000 | Busack | |
| 6,028,625 A | 2/2000 | Cannon | |
| 6,028,627 A | 2/2000 | Helmsderfer | |
| 6,032,084 A | 2/2000 | Anderson et al. | |
| 6,032,108 A | 2/2000 | Seiple et al. | |
| 6,032,530 A | 3/2000 | Hock | |
| 6,041,023 A | 3/2000 | Lakhansingh | |
| 6,043,747 A | 3/2000 | Altenhofen | |
| 6,045,364 A | 4/2000 | Dugan et al. | |
| 6,052,654 A | 4/2000 | Gaudet et al. | |
| 6,057,756 A | 5/2000 | Engellener | |
| 6,059,576 A | 5/2000 | Brann | |
| 6,073,086 A | 6/2000 | Marinelli | |
| 6,074,271 A | 6/2000 | Derrah | |
| 6,075,443 A | 6/2000 | Schepps et al. | |
| 6,091,342 A | 7/2000 | Janesch et al. | |
| 6,108,426 A | 8/2000 | Stortz | |
| 6,111,541 A | 8/2000 | Karmel | |
| 6,111,571 A | 8/2000 | Summers | |
| 6,122,340 A | 9/2000 | Darley et al. | |
| 6,122,959 A | 9/2000 | Hoshal et al. | |
| 6,122,960 A | 9/2000 | Hutchings et al. | |
| 6,125,686 A | 10/2000 | Haan et al. | |
| 6,127,931 A | 10/2000 | Mohr | |
| 6,145,389 A | 11/2000 | Ebeling et al. | |
| 6,148,271 A | 11/2000 | Marinelli | |
| 6,151,647 A | 11/2000 | Sarat | |
| 6,157,898 A | 12/2000 | Marinelli | |
| 6,160,254 A | 12/2000 | Zimmerman et al. | |
| 6,161,944 A | 12/2000 | Leman | |
| 6,163,021 A | 12/2000 | Mickelson | |
| 6,167,356 A | 12/2000 | Squadron et al. | |
| 6,172,948 B1 | 1/2001 | Keller et al. | |
| 6,179,432 B1 | 1/2001 | Zhang et al. | |
| 6,183,425 B1 | 2/2001 | Whalen et al. | |
| 6,191,939 B1 | 2/2001 | Burnett | |
| 6,196,932 B1 | 3/2001 | Marsh et al. | |
| 6,204,813 B1 | 3/2001 | Wadell et al. | |
| 6,208,044 B1 | 3/2001 | Viswanadham et al. | |
| 6,216,131 B1 | 4/2001 | Liu et al. | |
| 6,217,183 B1 | 4/2001 | Shipman | |
| 6,226,622 B1 | 5/2001 | Dabbiere | |
| 6,238,338 B1 | 5/2001 | DeLuca et al. | |
| 6,245,002 B1 | 6/2001 | Belikov | |
| 6,248,946 B1 | 6/2001 | Dwek | |
| 6,249,487 B1 | 6/2001 | Yano et al. | |
| 6,254,513 B1 | 7/2001 | Takenaka et al. | |
| 6,263,279 B1 | 7/2001 | Bianco et al. | |
| 6,266,623 B1 | 7/2001 | Vock et al. | |
| 6,295,541 B1 | 9/2001 | Bodnar et al. | |
| 6,298,314 B1 | 10/2001 | Blackadar et al. | |
| 6,305,221 B1 | 10/2001 | Hutchings | |
| 6,332,175 B1 | 12/2001 | Birrell et al. | |
| 6,336,365 B1 | 1/2002 | Blackadar et al. | |
| 6,336,727 B1 | 1/2002 | Kim | |
| 6,341,316 B1 | 1/2002 | Kloba et al. | |
| 6,356,856 B1 | 3/2002 | Damen et al. | |
| 6,357,147 B1 | 3/2002 | Darley et al. | |
| 6,360,597 B1 | 3/2002 | Hubbard, Jr. | |
| 6,377,530 B1 | 4/2002 | Burrows | |
| 6,380,597 B1 | 4/2002 | Gudesen et al. | |
| 6,385,473 B1 | 5/2002 | Haines et al. | |
| 6,436,052 B1 | 8/2002 | Nikolic et al. | |
| 6,441,747 B1 | 8/2002 | Khair et al. |
| 6,452,610 B1 | 9/2002 | Reinhardt et al. |
| 6,456,261 B1 | 9/2002 | Zhang |
| 6,459,881 B1 | 10/2002 | Hoder et al. |
| 6,467,924 B2 | 10/2002 | Shipman |
| 6,493,652 B1 | 12/2002 | Ohlenbusch et al. |
| 6,498,994 B2 | 12/2002 | Vock et al. |
| 6,501,393 B1 | 12/2002 | Richards et al. |
| 6,504,483 B1 | 1/2003 | Richards et al. |
| 6,516,284 B2 | 2/2003 | Flentov et al. |
| 6,527,711 B1 | 3/2003 | Stivoric |
| 6,529,131 B2 | 3/2003 | Wentworth |
| 6,531,982 B1 | 3/2003 | White et al. |
| 6,536,139 B2 | 3/2003 | Darley et al. |
| 6,539,336 B1 | 3/2003 | Vock et al. |
| 6,549,497 B2 | 4/2003 | Miyamoto et al. |
| 6,560,903 B1 | 5/2003 | Darley |
| 6,563,417 B1 | 5/2003 | Shaw |
| 6,570,526 B1 | 5/2003 | Noller et al. |
| 6,587,403 B1 | 7/2003 | Keller et al. |
| 6,587,404 B1 | 7/2003 | Keller et al. |
| 6,595,929 B2 | 7/2003 | Stivoric |
| 6,600,418 B2 | 7/2003 | Francis et al. |
| 6,605,038 B1 | 8/2003 | Teller et al. |
| 6,611,782 B1 | 8/2003 | Wooster |
| 6,611,789 B1 | 8/2003 | Darley |
| 6,617,962 B1 | 9/2003 | Horwitz et al. |
| 6,619,835 B2 | 9/2003 | Kita |
| 6,621,768 B1 | 9/2003 | Keller et al. |
| 6,623,427 B2 | 9/2003 | Mandigo |
| 6,633,743 B1 | 10/2003 | Berlinsky |
| 6,643,608 B1 | 11/2003 | Hershey et al. |
| 6,714,121 B1 | 3/2004 | Moore |
| 6,731,312 B2 | 5/2004 | Robbin |
| 6,735,630 B1 | 5/2004 | Gelvin et al. |
| 6,748,902 B1 | 6/2004 | Boesch et al. |
| 6,760,536 B1 | 7/2004 | Amir et al. |
| 6,762,741 B2 | 7/2004 | Weindorf |
| 6,772,331 B1 | 8/2004 | Hind et al. |
| 6,794,566 B2 | 9/2004 | Pachet |
| 6,799,226 B1 | 9/2004 | Robbin et al. |
| 6,801,964 B1 | 10/2004 | Mahdavi |
| 6,813,586 B1 | 11/2004 | Vock et al. |
| 6,825,777 B2 | 11/2004 | Vock et al. |
| 6,837,827 B1 | 1/2005 | Lee et al. |
| 6,856,934 B2 | 2/2005 | Vock et al. |
| 6,870,529 B1 | 3/2005 | Davis |
| 6,871,063 B1 | 3/2005 | Schiffer |
| 6,876,947 B1 | 4/2005 | Darley et al. |
| 6,882,955 B1 | 4/2005 | Ohlenbusch et al. |
| 6,883,694 B2 | 4/2005 | Abelow |
| 6,885,971 B2 | 4/2005 | Vock et al. |
| 6,898,550 B1 | 5/2005 | Blackadar et al. |
| 6,900,732 B2 | 5/2005 | Richards |
| 6,911,971 B2 | 6/2005 | Suzuki et al. |
| 6,914,551 B2 | 7/2005 | Vidal |
| 6,918,677 B2 | 7/2005 | Shipman |
| 6,934,812 B1 | 8/2005 | Robbin et al. |
| 6,950,087 B2 | 9/2005 | Knox et al. |
| 6,959,259 B2 | 10/2005 | Vock et al. |
| 7,009,517 B2 | 3/2006 | Wood |
| 7,042,360 B2 | 5/2006 | Light et al. |
| 7,046,230 B2 | 5/2006 | Zadesky |
| 7,054,784 B2 | 5/2006 | Flentov et al. |
| 7,062,225 B2 | 6/2006 | White |
| 7,064,669 B2 | 6/2006 | Light et al. |
| 7,072,789 B2 | 7/2006 | Vock et al. |
| 7,084,856 B2 | 8/2006 | Huppi |
| 7,084,921 B1 | 8/2006 | Ogawa |
| 7,092,846 B2 | 8/2006 | Vock et al. |
| 7,146,437 B2 | 12/2006 | Robbin et al. |
| 7,174,130 B2 | 2/2007 | Kurisko et al. |
| 7,174,277 B2 | 2/2007 | Vock et al. |
| 7,234,026 B2 | 6/2007 | Robbin et al. |
| 7,254,516 B2 | 8/2007 | Case et al. |
| 7,559,877 B2 | 7/2009 | Parks et al. |
| 7,813,715 B2 | 10/2010 | McKillop |
| 2001/0022828 A1 | 9/2001 | Pyles |
| 2001/0033244 A1 | 10/2001 | Harris et al. |

| | | | | | |
|---|---|---|---|---|---|
| 2001/0041021 A1 | 11/2001 | Boyle et al. | EP | 0336782 A2 | 10/1989 |
| 2001/0042107 A1 | 11/2001 | Palm | EP | 0578604 | 1/1994 |
| 2001/0049890 A1 | 12/2001 | Hirsch et al. | EP | 0 757 437 | 2/1997 |
| 2002/0002413 A1 | 1/2002 | Tokue | EP | 0 863 469 | 9/1998 |
| 2002/0013784 A1 | 1/2002 | Swanson | EP | 0 917 077 | 5/1999 |
| 2002/0022551 A1 | 2/2002 | Watterson et al. | EP | 0917893 B1 | 5/1999 |
| 2002/0032911 A1* | 3/2002 | Tanaka et al. ............... 725/153 | EP | 0 982 732 | 3/2000 |
| 2002/0045961 A1 | 4/2002 | Gibbs et al. | EP | 1 028 425 | 8/2000 |
| 2002/0046315 A1 | 4/2002 | Miller et al. | EP | 1028426 A2 | 8/2000 |
| 2002/0055934 A1 | 5/2002 | Lipscomb et al. | EP | 1 076 302 | 2/2001 |
| 2002/0090912 A1 | 7/2002 | Cannon et al. | EP | 1289197 | 3/2003 |
| 2002/0116082 A1 | 8/2002 | Gudorf | EP | 1 455 477 | 9/2004 |
| 2002/0152045 A1 | 10/2002 | Dowling et al. | EP | 1536612 | 6/2005 |
| 2002/0161865 A1 | 10/2002 | Nguyen | EP | 1566948 | 8/2005 |
| 2002/0173273 A1 | 11/2002 | Spurgat et al. | GB | 1567238 | 5/1980 |
| 2002/0189426 A1 | 12/2002 | Hirade et al. | GB | 2137363 | 10/1984 |
| 2003/0016844 A1 | 1/2003 | Numaoka | GB | 2384399 | 7/2003 |
| 2003/0037254 A1 | 2/2003 | Fischer et al. | JP | 59-023610 | 2/1984 |
| 2003/0046434 A1 | 3/2003 | Flanagin et al. | JP | 03-152469 | 6/1991 |
| 2003/0065805 A1 | 4/2003 | Barnes | JP | 2000122044 | 4/2000 |
| 2003/0074457 A1 | 4/2003 | Kluth | JP | 2000-224099 | 8/2000 |
| 2003/0076301 A1 | 4/2003 | Tsuk et al. | JP | 2000-299834 | 10/2000 |
| 2003/0079038 A1 | 4/2003 | Robbin et al. | JP | 2001-312338 | 11/2001 |
| 2003/0095096 A1 | 5/2003 | Robbin et al. | JP | 2001321202 | 11/2001 |
| 2003/0097379 A1 | 5/2003 | Ireton | JP | 2002-076977 | 3/2002 |
| 2003/0133694 A1 | 7/2003 | Yeo | JP | 2002101908 | 4/2002 |
| 2003/0149875 A1* | 8/2003 | Hosaka ........................ 713/168 | WO | WO 01/33569 | 6/1995 |
| 2003/0163287 A1 | 8/2003 | Volk et al. | WO | WO 95/16950 | 6/1995 |
| 2003/0167318 A1 | 9/2003 | Robbin et al. | WO | WO 98/17032 | 4/1998 |
| 2003/0229490 A1 | 12/2003 | Etter | WO | WO 98/06466 | 12/1998 |
| 2004/0001395 A1 | 1/2004 | Keller et al. | WO | WO 98/54581 | 12/1998 |
| 2004/0001396 A1 | 1/2004 | Keller et al. | WO | WO 00/22820 | 4/2000 |
| 2004/0012556 A1 | 1/2004 | Yong et al. | WO | WO 00/51259 | 8/2000 |
| 2004/0055446 A1 | 3/2004 | Robbin et al. | WO | WO 00/78170 | 12/2000 |
| 2004/0069122 A1 | 4/2004 | Wilson | WO | WO 01/01706 A1 | 4/2001 |
| 2004/0076086 A1 | 4/2004 | Keller et al. | WO | WO 01/65413 | 9/2001 |
| 2004/0086120 A1 | 5/2004 | Akins, III et al. | WO | WO 01/67753 | 9/2001 |
| 2004/0094018 A1 | 5/2004 | Ueshima et al. | WO | WO 02/25610 | 3/2002 |
| 2004/0104845 A1 | 6/2004 | McCarthy | WO | WO 03/023786 | 3/2003 |
| 2004/0198436 A1 | 10/2004 | Alden | WO | WO 03/067202 | 8/2003 |
| 2004/0224638 A1 | 11/2004 | Fadell et al. | WO | 2004/061850 A1 | 7/2004 |
| 2004/0253983 A1* | 12/2004 | Vanhatalo et al. ............ 455/558 | WO | WO 2004/055637 | 7/2004 |
| 2004/0267825 A1 | 12/2004 | Novak et al. | WO | WO2004/084413 A2 | 9/2004 |
| 2005/0015254 A1 | 1/2005 | Beaman | WO | WO 2005/031737 | 4/2005 |
| 2005/0027910 A1 | 2/2005 | Barrett, Jr. et al. | WO | WO 2005/048644 | 5/2005 |
| 2005/0080566 A1 | 4/2005 | Vock et al. | WO | WO 2005/008505 | 7/2005 |
| 2005/0088275 A1 | 4/2005 | Valoteau et al. | WO | WO 2005/109781 | 11/2005 |
| 2005/0152294 A1* | 7/2005 | Yu et al. ........................ 370/310 | WO | WO 2006/071364 | 6/2006 |
| 2005/0166153 A1 | 7/2005 | Eytchison et al. | WO | WO 2006/094380 | 9/2006 |
| 2005/5152294 | 7/2005 | Yu et al. | WO | WO 2007/022421 | 2/2007 |
| 2005/0177929 A1 | 8/2005 | Greenwald et al. | | | |
| 2005/0245839 A1 | 11/2005 | Stivoric et al. | | | |
| 2005/0262557 A1* | 11/2005 | Fellenstein et al. ............ 726/22 | | | |
| 2005/0266798 A1 | 12/2005 | Moloney et al. | | | |
| 2005/0266961 A1 | 12/2005 | Shum et al. | | | |
| 2006/0013414 A1 | 1/2006 | Shih | | | |
| 2006/0064458 A1* | 3/2006 | Gehrmann .................... 709/203 | | | |
| 2006/0068760 A1* | 3/2006 | Hameed et al. ............ 455/412.1 | | | |
| 2006/0097847 A1 | 5/2006 | Bervoets et al. | | | |
| 2006/0105712 A1* | 5/2006 | Glass et al. ................... 455/41.2 | | | |
| 2006/0135064 A1* | 6/2006 | Cho et al. ...................... 455/41.1 | | | |
| 2006/0143455 A1* | 6/2006 | Gitzinger ...................... 713/170 | | | |
| 2006/0152377 A1 | 7/2006 | Beebe et al. | | | |
| 2006/0190577 A1 | 8/2006 | Yamada | | | |
| 2006/0221788 A1 | 10/2006 | Lindahl et al. | | | |
| 2006/0265503 A1 | 11/2006 | Jones et al. | | | |
| 2007/0011919 A1 | 1/2007 | Case, Jr. | | | |
| 2007/0021269 A1 | 1/2007 | Shum | | | |
| 2007/0028009 A1 | 2/2007 | Robbin et al. | | | |
| 2007/0032195 A1* | 2/2007 | Kurisko et al. ............... 455/41.2 | | | |
| 2007/0124679 A1 | 5/2007 | Jeong et al. | | | |
| 2007/0249286 A1* | 10/2007 | Ma et al. ....................... 455/41.3 | | | |
| 2008/0016537 A1* | 1/2008 | Little et al. ...................... 725/81 | | | |
| 2008/0125288 A1 | 5/2008 | Case | | | |

FOREIGN PATENT DOCUMENTS

| | | |
|---|---|---|
| DE | 44 45 023 A1 | 6/1996 |
| DE | 10325805 | 1/2005 |
| EP | 0 127 139 | 5/1984 |

OTHER PUBLICATIONS

Motorola. "Motorola Bluetooth Wireless Headset User Guide", 2001.*
Motorola. MOTOMANUAL V3 GSM, 2004.*
Singelée, Dave et al. "Security Overview of Bluetooth", Jun. 2004.*
"Apple Announces iTunes 2," Press Release, Apple Computer, Inc., Oct. 23, 2001.
"Apple Introduces iTunes—World's Best and Easiest To Use Jukebox Software," Macworld Expo, San Francisco, Jan. 9, 2001.
"Apple's iPod Available in Stores Tomorrow," Press Release, Apple Computer, Inc., Nov. 9, 2001.
"Nomad Jukebox," User Guide, Creative Technology Ltd., Version 1, Aug. 2000.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
"12.1 925 Candela Mobile PC", downloaded from LCDHardware.com on Dec. 19, 2002, http://www.lcdharware.com/panel/12_1_panel/default.asp.
"BL82 Series Backlit Keyboards", www.tg3electronics.com/products/backlit/backlit.htm, downloaded Dec. 19, 2002.
"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.

"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].
"Digital Still Cameras—Downloading Images to a Computer," Mimi Chakarova et al., Multi-Media Reporting and Convergence, 2 pgs.
"Eluminx Illuminated Keyboard", downloaded Dec. 19, 2002, http://www.elumix.com/.
"How To Pair a Bluetooth Headset & Cell Phone", About.com; downloaded on Apr. 29, 2006 from http://mobileoffice.about.com/od/usingyourphone/ht/blueheadset_p.htm.
"Peripherals for Industrial Keyboards & Pointing Devices", Stealth Computer Corporation, downloaded on Dec. 19, 2002, http://www.stealthcomputer.com/peropherals_oem.htm.
"Poly-Optical Fiber Optic Membrane Switch Backlighting", downloaded Dec. 19, 2002, http://www.poly-optical.com/membrane_switches.html.
"Public Safety Technologies Tracer 2000 Computer", downloaded Dec. 19, 2002, http://www.pst911.com/traver.html.
"QuickTime Movie Playback Programming Guide", Apple Computer, Inc., Aug. 11, 2005.
"QuickTime Overview", Apple Computer, Inc., Aug. 11, 2005.
"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&lc=en&ver=4001&template=pc3_1_1&z....
"TAOS, Inc., Announces Industry's First Ambient Light Sensor to Convert Light Intensity to Digital Signals", www.taosinc.com/pressrelease_090902.htm, downloaded Jan. 23, 2003.
"Toughbook 28: Powerful, Rugged and Wireless", Panasonic: Toughbook Models, downloaded Dec. 19, 2002, http:www.panasonic.com/computer/notebook/html/01a_s8.htm.
"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.
"WhyBuy: Think Pad", IBM ThinkPad Web Page Ease of Use, downloaded on Dec. 19, 2002, http://www.pc.ibm.com/us/thinkpad/easeofuse.html.
512MB Waterproof MP3 Player with FM Radio & Built-in Pedometer, Oregon Scientific, downloaded on Jul. 31, 2006 from http://www2.oregonscientific.com/shop/product.asp?cid=4&scid=11&pid=581.
Adam C. Engst, "SoundJam Keeps on Jammin'," Jun. 19, 2000, http://db.tidbits.com/getbits.acgi?tbart=05988.
Alex Veiga, "AT&T Wireless Launching Music Service," Yahoo! Finance, Oct. 5, 2004, pp. 1-2.
Andrew Birrell, "Personal Jukebox (PJB)," Oct. 13, 2000, http://birrell.org/andrew/talks/pjb-overview.ppt.
Apple iPod Technical Specifications, iPod 20GB and 60GB Mac + PC, downloaded from http://www.apple.com/ipod/color/specs.html on Aug. 8, 2005.
Bociurkiw, Michael, "Product Guide: Vanessa Matz,", www.forbes.com/asap/2000/1127/vmartz_print.html, Nov. 27, 2000.
Compaq, "Personal Jukebox," Jan. 24, 2001, http://research.compaq.com/SRC/pjb.
Creative: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].
Creative: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].
Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].
De Herrera, Chris, "Microsoft ActiveSync 3.1," Version 1.02, Oct. 13, 2000.
iAP Sports Lingo 0x09 Protocol V1.00, May 1, 2006.
IEEE 1394—Wikipedia. 1995, http://www.wikipedia.org/wiki/Firewire.
Written Opinion of the International Searching Authority dated Nov. 24, 2006 in PCT Application No. PCT/US2005/046797.
International Search Report dated Feb. 4, 2003 in corresponding application No. PCT/US2002/033330.
International Search Report dated Jul. 10, 2007 in corresponding application No. PCT/US2006/048738.
International Search Report dated Apr. 5, 2006 from corresponding International Application No. PCT/US2005/038819.
International Search Report dated Jul. 2, 2007 in related case PCT/US2006/048669.
International Search Report dated Jun. 19, 2007 in related Application PCT/US2006/048753.
International Search Report dated May 21, 2007 from corresponding PCT Application No. PCT/US2006/048670.
International Search Report in corresponding European Application No. 06256215.2 dated Feb. 20, 2007.
Invitation to Pay Additional Fees and Partial Search Report for corresponding PCT Application No. PCT/US2005/046797 dated Jul. 3, 2006.
iTunes 2, Playlist Related Help Screens, iTunes v2.0, Apple Computer, Inc., Oct. 23, 2001.
iTunes, Playlist Related Help Screens, iTunes v1.0, Apple Computer, Inc., Jan. 2001.
Jabra Bluetooth Headset User Manual; GN Netcom A/s, 2005.
Jabra Bluetooth Introduction; GN Netcom A/S, Oct. 2004.
Jabra FreeSpeak BT200 User Manual; Jabra Corporation, 2002.
Kennedy, "Digital Data Storage Using Video Disc," IBM Technical Disclosure Bulletin, vol. 24, No. 2, Jul. 1981.
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, http://www.musicmatch.com/info/company/press/releases/?year=1998&release=2.
Nonhoff-Arps, et al., "Straßenmusik Portable MP3-Spieler mit USB-Anschluss," CT Magazin Fuer Computer Technik, Verlag Heinz Heise GMBH, Hannover DE, No. 25, Dec. 4, 2000.
International Search Report dated Nov. 24, 2006 in PCT Application No. PCT/US2005/046797.
Personal Jukebox (PJB), "Systems Research Center and PAAD," Compaq Computer Corp., Oct. 13, 2000, http://research.compaq.com/SRC/pjb/.
Peter Lewis, "Two New Ways to Buy Your Bits," CNN Money, Dec. 31, 2003, pp. 1-4.
Sastry, Ravindra Wadali. "A Need for Speed: A New Speedometer for Runners", submitted to the Department of Electrical Engineering and Computer Science at the Massachusetts Institute of Technology, May 28, 1999.
Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208-212.
SoundJam MP Plus, Representative Screens, published by Casady & Greene, Inc., Salinas, CA, 2000.
Specification Sheet, iTunes 2, Apple Computer, Inc., Oct. 31, 2001.
Spiller, Karen. "Low-decibel earbuds keep noise at a reasonable level", The Telegraph Online, dated Aug. 13, 2006, http://www.nashuatelegraph.com/apps/pbcs.dll/article?Date=20060813&Cate.. Downloaded Aug. 16, 2006.
Steinberg, "Sonicblue Rio Car," Product Review, Dec. 12, 2000, http://electronics.cnet.com/electronics/0-6342420-1304-4098389.html.
Travis Butler, "Archos Jukebox 6000 Challenges Nomad Jukebox," Aug. 13, 2001, http://db.tidbits.com/getbits.acgi?tbart=06521.
Travis Butler, "Portable MP3: The Nomad Jukebox," Jan. 8, 2001, http://db.tidbits.com/getbits.acgi?tbart=06261.
U.S. Appl. No. 11/621,541, "Personalized Podcasting Podmapping" filed Jan. 9, 2007.
Waterproof Music Player with FM Radio and Pedometer User Manual, Oregon Scientific, 2005.

U.S. Appl. No. 10/125,893, filed Apr. 18, 2002 and titled "Power Adapters for Powering and/or Charging Peripheral Devices."
International Search Report dated Dec. 5, 2007 in PCT Application No. PCT/US2007/004810.
Written Opinion dated Dec. 5, 2007 in PCT Application No. PCT/US2007/004810.
Partial Search Report dated Sep. 6, 2007 in PCT Application No. PCT/US2007/004810.
International Search Report dated Dec. 6, 2007 in PCT Application No. PCT/US2007/010888.
Written Opinion dated Dec. 6, 2007 in PCT Application No. PCT/US2007/010888.
Apple iTunes Smart Playlists, downloaded Apr. 5, 2005 from http://web.archive.org/web/20031002011316/www.apple.com/itunes/smartplaylists.... pp. 1-2.
Hart-Daves, Guy, "How To Do Everything with Your IPod & Mini IPod Mini", 2004, McGraw-Hill Professional, p. 33.
International Search Report in Patent Application No. PCT/US2006/048738 dated Jan. 29, 2008.
International Search Report in Patent Application No. PCT/US2007/077020 dated Jan. 28, 2008.
International Search Report in Patent Application No. PCT/US2007/076889 dated Jan. 28, 2008.
iTunes, Wikipedia, the free encyclopedia; downloaded on Oct. 5, 2005, pp. 1-6.
Nutzel et al., "Sharing Systems for Future HiFi Systems", The Computer Society, Jun. 2004.
Office Action Dated Feb. 1, 2008 in U.S. Appl. No. 11/327,544.
Office Action Dated Feb. 4, 2008 in U.S. Appl. No. 11/566,072.
Written Opinion in Patent Application No. PCT/US2006/048738 dated Jan. 29, 2008.
Written Opinion in Patent Application No. PCT/US2007/076889 dated Jan. 28, 2008.
Written Opinion in Patent Application No. PCT/US2007/077020 dated Jan. 28, 2008.
Partial Search Report and Invitation to Pay Fees dated Apr. 8, 2008 in PCT Application No. PCT/US2007/012033.
EP989288543 Supplementary European Search Report; Feb. 18, 2002.
PCT/US98/11268 International Search Report mailed Jan. 11, 1999.
PCT/US00/18237 International Search Report; Oct. 17, 2000.
PCT/US01/51620 International Search Report mailed Sep. 25, 2002.
PCT/US00/18237 International Preliminary Examination Report; Sep. 11, 2003.
Civil Action No. 05-CV-02323; Complaint, Nov. 16, 2005.
Civil Action No. 06-CV-01100-WDM-PAC, Complaint, Jun. 8, 2000.
Civil Action No. 06-CV-01100-WDM-PAC, Defendants Polar Electro Inc.'s And Polar Electro Oy's Answer And Affirmative Defenses: Polar Electro Inc.'s Counterclaim and Demand For Jury Trial, Jun. 29, 2006.
Civil Action No. 06-CV-01447-MSK-BNB, Complaint, Jul. 26, 2006.
Civil Action No. 06-CV-01447 MSK-BNB, First Amended Complaint; Aug. 16, 2006.
Civil Action No. 06-CV-01447-MSK-BNB, Answer, Affirmative Defenses, Counterclaim, And Demand For Jury Trial, Garmin; Sep. 26, 2006.
Civil Action No. 06-CV-01447-MSK-BNB; Garmin Disclosure Statement; Sep. 26, 2006.
Civil Action No. 06-CV-01447 MSK-BNB, Answer, Affirmative Defenses, Counterclaims and Demand for Jury Trial, Timex; Sep. 26, 2006.
Civil Action No. 06-CV-01447-MSK-BNB; Timex Disclosure Statement; Sep. 26, 2006.
Civil Action No. 06-CV-01447-MSK-BNB: PhatRat Technology, Inc.'s Supplemental Answers and Objections to Defendant, Timex Corporation's Interrogatories Nos. 1, 2, 5, 7-11, 13 and 15; Feb. 12, 2007.
Civil Action No. 06-CV-02122-REB-MJW, Complaint, Oct. 24, 2006.
Civil Action No. 06-CV-02122-REB-MJW, Apple Computer, Inc.'s Answer to Complaint and Counterclaims, Jan. 22, 2007.
Civil Action No. 07-CV-00078-MSK-BNB, Complaint, Jan. 12, 2007.
Civil Action No. 07-CV-00078-MSK-BNB, Answer, Feb. 9, 2007.
Civil Action No. 07-CV-00238-REB-PAC, Complaint, Mar. 19, 2007.
Civil Action No. 07-CV-00238-REB, Apple Inc.'s Answer to Complaint, Counterclaims and Jury Demand, Mar. 19, 2007.
Civil Action No. 07-CV-00238; Nike Inc.'s Answer, Affirmative Defenses to First Complaint, Mar. 19, 2007.
U.S. Appl. No. 08/764,758, Office Action mailed Aug. 21, 1997.
U.S. Appl. No. 08/764,758, Response to Office Action mailed Aug. 21, 1997.
U.S. Appl. No. 08/764,758, Office Action mailed Dec. 15, 1998.
U.S. Appl. No. 08/764,758, Response to Office Action mailed Dec. 15, 1998.
U.S. Appl. No. 08/764,758, Office Action mailed May 8, 1998.
U.S. Appl. No. 08/764,758, Response to Office Action mailed May 8, 1998, filed Oct. 8, 1998.
U.S. Appl. No. 08/764,758, Notice of Allowance mailed Jun. 1, 1999.
U.S. Appl. No. 08/764,758, Advisory Action mailed Apr. 29, 1999.
U.S. Appl. No. 08/867,083, Office Action mailed Apr. 8, 1999.
U.S. Appl. No. 08/764,758, Rule 116 Amendment filed Apr. 8, 1999.
U.S. Appl. No. 08/764,758, Rule 116 Amendment filed May 13, 1999.
U.S. Appl. No. 08/867,083, Response to Office Action mailed Apr. 8, 1999.
U.S. Appl. No. 08/867,083, Supp. Response to Office Action mailed Apr. 8, 1999.
U.S. Appl. No. 08/867,083, Final Office Action mailed Jan. 3, 2000.
U.S. Appl. No. 08/867,083, Notice of Appeal mailed Jan. 3, 2000.
U.S. Appl. No. 08/867,083, Notice of Appeal Response to Office Action mailed Jan. 3, 2000.
U.S. Appl. No. 08/867,083, Advisory Action mailed Mar. 14, 2000.
U.S. Appl. No. 08/867,083 Office Action mailed Jun. 26, 2000.
U.S. Appl. No. 08/867,083 Amendment response to Office Action mailed Jun. 26, 2000.
U.S. Appl. No. 08/867,083 Notice of Allowance, mailed Feb. 6, 2001.
U.S. Appl. No. 09/089,232, Information Disclosure Statement mailed Oct. 23, 1998.
U.S. Appl. No. 09/089,232, Office Action mailed Nov. 27, 1998.
U.S. Appl. No. 09/089,232, Office Action mailed May 30, 2000.
U.S. Appl. No. 09/089,232, Preliminary Amendment response to Office Action mailed May 30, 2000.
U.S. Appl. No. 09/089,232, Office Action mailed Dec. 19, 2000.
U.S. Appl. No. 09/089,232, Response to Office Action mailed Dec. 19, 2000.
U.S. Appl. No. 09/089,232, Office Action mailed Aug. 8, 2001.
U.S. Appl. No. 09/089,232, Notice of Appeal mailed Nov. 5, 2001.
U.S. Appl. No. 09/089,232, Notice of Appeal mailed Nov. 7, 2001.
U.S. Appl. No. 09/089,232, Appeal Brief mailed Jan. 2, 2002.
U.S. Appl. No. 09/089,232, Office Action mailed Apr. 26, 2002.
U.S. Appl. No. 09/089,232, Appeal Brief mailed Jul. 26, 2002.
U.S. Appl. No. 09/089,232, Notice of Allowance mailed Oct. 2, 2002.
U.S. Appl. No. 09/089,232, Comments on Allowance mailed Oct. 16, 2002.
U.S. Appl. No. 09/089,232, Office Action mailed Jan. 27, 2003.
U.S. Appl. No. 09/698,659, Office Action mailed Mar. 19, 2002.
U.S. Appl. No. 09/698,659, Response to Office Action of Mar. 19, 2002.
U.S. Appl. No. 09/698,659, Office Action mailed Nov. 21, 2002.
U.S. Appl. No. 09/698,659, Response to Office Action of Nov. 21, 2002.
U.S. Appl. No. 09/698,659, Notice of Allowance mailed Apr. 9, 2003.
U.S. Appl. No. 09/848,445, Preliminary Amendment mailed Dec. 5, 2001.
U.S. Appl. No. 09/848,445, Office Action mailed Dec. 5, 2003.
U.S. Appl. No. 09/848,445, Response to Office Action mailed Dec. 5, 2003.
U.S. Appl. No. 09/848,445, Office Action mailed May 6, 2004.
U.S. Appl. No. 09/848,445, Response to Office Action (Rule 116) mailed May 6, 2004.
U.S. Appl. No. 09/886,578, Preliminary Amendment mailed Jun. 21, 2001.

U.S. Appl. No. 09/886,578, Office Action mailed Nov. 8, 2001.
U.S. Appl. No. 09/886,578, Response to Office Action mailed Nov. 8, 2001.
U.S. Appl. No. 09/886,578, Office Action mailed Jun. 5, 2002.
U.S. Appl. No. 09/886,578, Response to Office Action mailed Jun. 5, 2002.
U.S. Appl. No. 09/886,578, Notice of Allowance mailed Sep. 9, 2002.
U.S. Appl. No. 09/992,966, Office Action mailed Feb. 3, 2003.
U.S. Appl. No. 09/992,966, Response to Office Action mailed Feb. 3, 2003.
U.S. Appl. No. 09/992,966, Office Action mailed Mar. 28, 2002.
U.S. Appl. No. 09/992,966, Response to Office Action mailed Mar. 28, 2002.
U.S. Appl. No. 09/992,966, Office Action mailed Jul. 18, 2003.
U.S. Appl. No. 09/992,966, Response to Office Action mailed Jul. 18, 2003.
U.S. Appl. No. 09/992,966, Examiner Summary mailed Oct. 27, 2003.
U.S. Appl. No. 09/992,966, Notice of Allowance mailed Apr. 15, 2004.
U.S. Appl. No. 09/992,966, Office Action mailed Jan. 6, 2004.
U.S. Appl. No. 09/992,966, Response to Office Action mailed Jan. 6, 2004.
U.S. Appl. No. 09/992,966, Notice of Allowance mailed Sep. 3, 2004.
U.S. Appl. No. 10/234,660, Office Action mailed Mar. 31, 2003.
U.S. Appl. No. 10/234,660, Response to Office Action mailed Mar. 31, 2003.
U.S. Appl. No. 10/234,660, Final Office Action mailed Oct. 31, 2003.
U.S. Appl. No. 10/234,660 Response and Amendment Under 37 CFR Section 1.116 mailed Oct. 31, 2003.
U.S. Appl. No. 10/234,660; Advisory Action mailed Jan. 27, 2004.
U.S. Appl. No. 10/234,660; Appeal Brief filed Jun. 14, 2004.
U.S. Appl. No. 10/234,660; Amendment filed Jul. 20, 2004.
U.S. Appl. No. 10/234,660; Marked up Claims by USPTO dated Jul. 28, 2004.
U.S. Appl. No. 10/234,660; Notice of Allowance; Aug. 2, 2004.
U.S. Appl. No. 10/297,270 Office Action mailed Jul. 29, 2004.
U.S. Appl. No. 10/297,270 Response to Office Action mailed Jul. 29, 2004.
U.S. Appl. No. 10/297,270 Office Action mailed Dec. 13, 2004.
U.S. Appl. No. 10/297,270 Response to Office Action mailed Dec. 13, 2004.
U.S. Appl. No. 10/297,270 Request Deletion of Named Inventors Pursuant to 37 CFR § 1.63 (d)(2) received by the Patent Office on Oct. 4, 2002.
U.S. Appl. No. 10/297,270 Office Action mailed Jul. 13, 2005.
U.S. Appl. No. 10/297,270 Response to Office Action mailed Jul. 13, 2005.
U.S. Appl. No. 10/297,270 Office Action mailed Feb. 9, 2006.
U.S. Appl. No. 10/297,270 Response to Office Action mailed Feb. 9, 2006.
U.S. Appl. No. 10/297,270 Office Action mailed Sep. 25, 2006.
U.S. Appl. No. 10/297,270 Response to Office Action mailed Sep. 25, 2006.
U.S. Appl. No. 10/297,270 Office Action mailed Jan. 11, 2007.
U.S. Appl. No. 10/297,270 Response to Office Action mailed Jan. 11, 2007.
U.S. Appl. No. 10/297,270 Office Action mailed Jul. 26, 2007.
U.S. Appl. No. 10/297,270 Response to Office Action mailed Jul. 26, 2007.
U.S. Appl. No. 10/601,208 Preliminary Amendment, mailed Jun. 20, 2003.
U.S. Appl. No. 10/601,208 Office Action mailed Jun. 15, 2004.
U.S. Appl. No. 10/601,208 Response to Office Action mailed Jun. 15, 2004.
U.S. Appl. No. 10/601,208 Office Action mailed Aug. 26, 2004.
U.S. Appl. No. 10/601,208 Response to Office Action mailed Aug. 26, 2004.
U.S. Appl. No. 10/601,208 Second Response to Office Action mailed Aug. 26, 2004.
U.S. Appl. No. 10/601,208 Office Action mailed May 11, 2005.
U.S. Appl. No. 10/601,208 Response to Office Action mailed May 11, 2005.
U.S. Appl. No. 10/601,208 Office Action mailed Feb. 15, 2006.
U.S. Appl. No. 10/601,208 Response to Office Action mailed Feb. 15, 2006.
U.S. Appl. No. 10/601,208 Office Action mailed Sep. 26, 2006.
U.S. Appl. No. 10/601,208 Response to Office Action mailed Sep. 26, 2006.
U.S. Appl. No. 10/601,208 Notice of Allowance mailed Dec. 8, 2006.
U.S. Appl. No. 10/842,947, Preliminary Amendment mailed May 11, 2004.
U.S. Appl. No. 10/842,947, Office Action mailed Nov. 30, 2004.
U.S. Appl. No. 10/842,947, Response to Office Action mailed Nov. 30, 2004.
U.S. Appl. No. 10/842,947, Office Action mailed Jun. 30, 2005.
U.S. Appl. No. 10/842,947, Response to Office Action mailed Jun. 30, 2005.
U.S. Appl. No. 10/842,947, Notice of Allowance mailed Feb. 9, 2006.
U.S. Appl. No. 10/921,743; Office Action mailed Mar. 4, 2005.
U.S. Appl. No. 10/921,743; Response to Office Action mailed Mar. 4, 2005.
U.S. Appl. No. 10/921,743; Office Action mailed May 26, 2005.
U.S. Appl. No. 10/921,743; Response to Office Action mailed May 26, 2005.
U.S. Appl. No. 10/921,743; Office Action mailed Sep. 13, 2005.
U.S. Appl. No. 10/921,743; Advisory mailed Nov. 25, 2005.
U.S. Appl. No. 10/921,743; Response to Office Action mailed Sep. 13, 2005 and Advisory mailed Nov. 25, 2005.
U.S. Appl. No. 10/950,897, Notice of Allowance mailed Feb. 13, 2005.
U.S. Appl. No. 10/950,897, Office Action mailed Mar. 7, 2005.
U.S. Appl. No. 10/950,897, Response to Office Action mailed Mar. 7, 2005.
U.S. Appl. No. 10/950,897, Office Action mailed Jun. 23, 2005.
U.S. Appl. No. 10/950,897, Response to Office Action mailed Jun. 23, 2005.
U.S. Appl. No. 10/950,897, Office Action mailed Sep. 9, 2005.
U.S. Appl. No. 10/950,897, Response to Office Action mailed Sep. 9, 2005.
U.S. Appl. No. 10/950,897, Office Action mailed Nov. 25, 2005.
U.S. Appl. No. 10/950,897, Response to Office Action mailed Nov. 25, 2005.
U.S. Appl. No. 10/950,897, Amendment to Notice of Allowance mailed Dec. 13, 2005.
U.S. Appl. No. 11/221,029; Preliminary Amendment dated Aug. 22, 2006.
U.S. Appl. No. 11/221,029; Office Action mailed Sep. 8, 2006.
U.S. Appl. No. 11/221,029; Response to Office Action mailed Sep. 8, 2006.
U.S. Appl. No. 11/221,029; Notice of Allowance; Oct. 3, 2006.
U.S. Appl. No. 11/252,576; Notice of Allowance; Dec. 11, 2007.
U.S. Appl. No. 11/358,508; Notice of Non Compliance mailed Sep. 12, 2006.
U.S. Appl. No. 11/358,508, Preliminary Amendment mailed Mar. 30, 2006.
U.S. Appl. No. 11/358,508, Preliminary Amendment mailed May 30, 2006.
U.S. Appl. No. 11/358,508, Preliminary Amendment mailed Jul. 26, 2006.
U.S. Appl. No. 11/358,508, Office Action mailed Aug. 14, 2006.
U.S. Appl. No. 11/358,508, Response to Office Action mailed Aug. 14, 2006.
U.S. Appl. No. 11/358,508, Response to Notice mailed Sep. 12, 2006.
U.S. Appl. No. 11/358,508, Notice of Allowability & Interview Summary mailed Oct. 18, 2006.
U.S. Appl. No. 11/358,508, Rule 312 Amendment mailed Oct. 24, 2006.
U.S. Appl. No. 11/434,588: Office Action mailed Jan. 31, 2007.
U.S. Appl. No. 11/434,588; Response to Office Action mailed Jan. 31, 2007.
U.S. Appl. No. 11/434,588; Notice of Allowance; Jul. 11, 2007.
U.S. Appl. No. 11/434,588; Notice of Allowance; Nov. 6, 2007.
U.S. Appl. No. 11/484,199 Preliminary Amendment; Sep. 7, 2006.
U.S. Appl. No. 11/484,199 Notice of Allowance and Examiner Interview Summary; Oct. 6, 2006.

U.S. Appl. No. 11/598,410, Office Action mailed Jun. 13, 2007.
U.S. Appl. No. 11/598,410 Response to Office Action mailed Jun. 13, 2007.
U.S. Appl. No. 11/598,410, Notice of Allowability Sep. 26, 2007.
U.S. Appl. No. 11/646,768, Office Action mailed May 7, 2007.
U.S. Appl. No. 11/646,768, Response to Office Action mailed May 7, 2007.
U.S. Appl. No. 11/646,768, Office Action mailed Oct. 29, 2007.
U.S. Appl. No. 11/646,768, Response to Office Action mailed Oct. 29, 2007.
U.S. Appl. No. 11/646,768; Notice of Allowance; Jan. 18, 2008.
U.S. Appl. No. 11/747,081; Office Action mailed Jan. 24, 2008.
Cole, George, "The Little Label with an Explosion of Applications", Financial Times, Ltd., 2002, pp. 1-3.
Deem, "Fast Forward Go For A Ride On The World's Fastest Sailboat", Popular Mechanics, www.popularmechanics.com, Feb. 2001, pp. 1-2.
Desmarais, "Solutions In Hand", BEI Technologies, Inc., www.sensormag.com, Jan. 2001, pp. 1-2.
Desmarais et al., "How to select and use the right temperature," www.sensorsmag.com, Jan. 2001, pp. 30-36.
GPS Locator for Children, Klass Kids Foundation Jul. 15, 2004.
Henkel, Research & Developments, *Sensors*, Nov. 2000. p. 18.
Janssens et al., "Columbus: A Novel Sensor System for Domestic Washing Machines", *Sensors Magazine* Online, Jun. 2002 , pp. 1-9.
Licking, Special Report: E-Health, "This is the Future of Medicine", Business Week E.Biz, Dec. 11, 2000, pp. 77 and 78 US.
Li-Ron, Tomorrow's Cures, Health & Fitness Special Section Online, Newsweek, Dec. 10, 2001, pp. 3-10.
Mark of Fitness Flyer, "High Quality, Self-Taking Blood Pressure Monitors", four pages, Shrewsbury, NJ, US.
Martella, Product News, "Temperature Monitoring System", Nov. 2000, p. 77.
Nobbe, "Olympic Athletes Get a Boost from Technology", *Machine Design*, vol. 60, No. 19, Aug. 25, 1988.
Paradiso et al., Design and Implementation of Expressive Footwear, May 12, 2000, IBM Systems Journal, vol. 39, Nos. 3&4, pp. 511-529.
Paradiso, et al. "Instrumented Footwear for Interactive Dance" Version 1.1, Presented at the XII Colloquium on Musical Informatics, Gorizia, Italy, Sep. 24-26, 1998, pp. 1-4.
Sellers. Gear to Go, Mitch Mandel Photography, Mar. 2001, pp. 61-62.
Shannon P. Jackson and Harold Kirkham, "Weighing Scales Based on Low-Power Strain-Gauge Circuits", NASA Tech Briefs, Jun. 2001, p. 49 US.
Sharp, A Sense of the Real World, www.idsystems.com/reader/2000_09/sens0900.htm, Sep. 2000, 4 pages.

Skaloud et al., DGPS-Calibrated Accelerometric System for Dynamic Sports Events, Sep. 19-22, 2000, ION GPS 2000.
Smith et al., "Flexible and Survivable Non-Volatile Memory Data Recorder", AFRL Technology Horizons, Dec. 2000, p. 26.
Webster's II New Riverside University Dictionary, 1988, The Riverside Publishing Company, p. 1138.
Wysocki, Jr., Staff Reporter, "Do Devices Measuring Body Signs Appeal To the Sick or Healthy", Pittsburgh, US.
No author listed, "Ever Forget to Bring Your Cell Phone or Keys?", Catalog Page, PI Manufacturing Corp, 20732 Currier Rd., Walnut, CA 91789, Home Office Accessory, Catalog Nos. TA-100N; TA-100M; TA-100F, US.
No author listed, "Your Next . . . ", *Newsweek*, Jun. 25, 2001, p. 52 US.
No author listed, The GPS Connection, *Popular Mechanics*, Feb. 2001, p. 65.
No author listed, WarmMark Time Temperature Indicators, www.coldice.com/warmmark_temperature_indicators.html, Cold Ice., Inc.
No author listed, Wireless Temperature Monitor, www.echo-on.net/mob/, Nov. 20. 2000.
Unattributed, 3M MonitorMark Indicator Data Sheet [online], [retrieved on Aug. 9, 2004], retrieved from the Internet: URL: http://www.3m.com/us/healthcare/medicalspecialties/monitor/products.html; 4 pages.
International Search Report dated Jul. 7, 2008 in PCT Application No. PCT/US2007/012033.
Written Opinion dated Jul. 7, 2008 in PCT Application No. PCT/US2007/012033.
Apple iTunes Smart Playlists, downloaded Apr. 5, 2005 from http://web.archive.org/web/20031002011316/www.apple.com/itunes/smartplaylists.... pp. 1-2.
Notice of Allowance dated Dec. 31, 2009 in U.S. Appl. No. 11/683,391.
Office Action dated Dec. 2, 2009 in U.S. Appl. No. 11/513,616.
Office action dated Jan. 27, 2010 in U.S. Appl. No. 11/585,721.
Office Action dated Sep. 4, 2009 in U.S. Appl. No. 11/585,721.
Office Action dated May 13, 2009 in U.S. Appl. No. 11/585,721.
Notice of Allowance dated Oct. 8, 2009 in U.S. Appl. No. 11/439,523.
Office Action dated Aug. 20, 2009 in U.S. Appl. No. 11/513,616.
Office Action dated Sep. 17, 2009 in U.S. Appl. No. 11/683,391.
Office Action dated Apr. 2, 2009 in U.S. Appl. No. 11/683,391.
Office Action dated Mar. 4, 2009 in U.S. Appl. No. 11/513,616.
Office Action dated Apr. 14, 2009 in U.S. Appl. No. 11/439,523.
Office Action dated Oct. 29, 2008 in U.S. Appl. No. 11/566,072.
Notice of Allowance dated Jun. 17, 2010 in U.S. Appl. No. 11/513,616.

* cited by examiner

PAIRING OF WIRELESS DEVICES USING A WIRED MEDIUM

CROSS-REFERENCE TO RELATED APPLICATIONS

This application is related to: (i) U.S. patent application Ser. No. 11/245,937, filed Oct. 7, 2005, and entitled "TECHNIQUES FOR PAIRING REMOTE CONTROLLERS WITH HOST DEVICES", which is hereby incorporated by reference herein; and (ii) U.S. patent application Ser. No. 11/513,616, filed concurrently, and entitled "AUTOMATED PAIRING OF WIRELESS ACCESSORIES WITH HOST DEVICE", which is hereby incorporated by reference herein.

BACKGROUND OF THE INVENTION

1. Field of the Invention

The present invention relates to wireless devices and, more particularly, to pairing wireless devices for authorized data exchange.

2. Description of the Related Art

Traditionally, headphones or earphones are connected to an audio output device, such as a mobile phone, through a wired connection. The wired connection can, however, in many cases be cumbersome or annoying to the user. Hence, in recent times, wireless headsets or earphones have been developed. Typically, these wireless devices utilize BLUETOOTH short range local wireless network technology in order to wirelessly transmit data between the headset or earphone and the mobile phone. As a result, there is no need for a wired connection between the headset or earphones and the media player.

Unfortunately, however, before the wireless headset or earphone can operate in a wireless manner with a mobile phone, the wireless headset or earphone must be paired with the mobile phone. Pairing is a process that is used to associate a headset or earphone with a particular mobile phone, and vice versa. The pairing provides for secure data transfer between the devices, typically through use of encryption. Thus, the pairing helps ensure that the data being transferred is not only secured but also transferred to the appropriate recipient device. Pairing, however, requires that a pin code be entered in order to pair a mobile phone with a headset or earphone. Entering of a pin code is sometimes problematic for a user. For example, often mobile audio devices are small handheld devices and the entering of a pin code can be cumbersome given the small scale of mobile audio devices (e.g., mobile phones, portable music players, etc.). The mobile audio devices may also not offer a user interface that supports ease of entry of a pin code. Still further, users often do not know the appropriate pin code to be utilized.

Moreover, similar difficulties exist for other types of wireless devices besides headsets and earphones. For example, other wireless devices that also need to undergo pairing include remote controllers, computing devices, peripheral devices, etc.

Thus, there is a need for improved techniques to facilitate pairing of wireless devices.

SUMMARY OF THE INVENTION

The invention pertains to improved techniques that facilitate pairing of wireless devices with other wireless devices. According to one aspect of the invention, a pair of wireless devices can be paired for wireless data exchange using an available wired link. Advantageously, the wired link can be used to transport a pin code from one of the wireless devices to the other. Consequently, pairing of the wireless devices can be completed without necessitating user entry of a pin code so long as the wired link is available.

The invention can be implemented in numerous ways, including as a method, system, device, apparatus, or computer readable medium. Several embodiments of the invention are discussed below.

As a method for pairing a host device with a wireless device, one embodiment of the invention includes at least the acts of: detecting a wired data link between the host device and the wireless device; establishing a wireless data link between the host device and the wireless device; retrieving a pin code internal to the host device; sending the pin code to the wireless device over the wired data link; receiving authentication data from the wireless device; authenticating the wireless device based on the received authentication data; and completing pairing of the host device with the wireless device when the wireless device has been authenticated.

As a host computing device with support for a wired data link and a wireless data link, one embodiment of the invention includes at least: a connection manager configured to detect a wired data link between the host computing device and a wireless device; a wireless transceiver for transferring data between the host computing device and the wireless device over a wireless data link, and a pairing manager operatively connected to the peripheral bus driver and the wireless transceiver. The pairing manager manages pairing of the host computing device and the wireless device. The pairing manager can operate to: (i) retrieve a pin code internal to the host computing device, (ii) send the pin code to the wireless device over the wired data link, (iii) receive authentication data from the wireless device, and (iv) authenticate the wireless device based on the received authentication data.

As a method for pairing a wireless device with a host device, one embodiment of the invention includes at least the acts of: detecting a wired data link between the host device and the wireless device; detecting a wireless data link between the host device and the wireless device; receiving a pin code over the wired data link from the host device; generating authentication data at the wireless device based on the pin code; sending the authentication data from the wireless device to the host device; and subsequently completing pairing of the wireless device with the host device when authentication is successful.

As a computer readable medium including at least computer program code for pairing a first wireless device with a second wireless device, one embodiment of the invention includes at least: computer program code for detecting a wired data link between the first wireless device and the second wireless device; computer program code for detecting a wireless data link between the first wireless device and the second wireless device; computer program code for receiving, at the second wireless device, a code over the wired data link from the first wireless device; and performing pairing operations to pair the first wireless device and the second wireless device based on the code received over the wired data link.

As an electronic device having wireless capabilities, another embodiment of the invention includes at least operating the electronic device such that pairing of the electronic device to another electronic device having wireless capabilities includes electrically sending a code over a physical connection between the electronic device and the another electronic device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques that facilitate pairing of wireless devices with other wireless devices. According to one aspect of the invention, a pair of wireless devices can be paired for wireless data exchange using an available wired link. Advantageously, the wired link can be used to transport a pin code from one of the wireless devices to the other. Consequently, pairing of the wireless devices can be completed without necessitating user entry of a pin code so long as the wired link is available.

The wired link can be implemented by a wired medium that physically provides one or more electrical connections. Typically, the wired medium is used to removably connect a pair of wireless devices. As one example, the wired medium can be a peripheral bus (e.g., USB or Firewire) cable (or cord) that removably connects the pair of wireless devices together and permits a peripheral bus to be established therebetween.

Of a pair of wireless devices being paired, one of the wireless devices can be a wireless host device. As an example, the wireless host device can be a computing device (e.g., personal computer, media device, etc.). The other of the wireless devices can be a peripheral device, an accessory or another computing device. As examples, a peripheral device can be a data storage device, a printer, or an input device (e.g., mouse, keyboard). An accessory device can, for example, be a headset, earphones or remote controller. In one embodiment, a media device can be a mobile phone, a media player (e.g., portable media player), a docking station for a portable media player, or a dedicated media appliance.

Embodiments of this aspect of the invention are discussed below with reference to FIGS. 1-7. However, those skilled in the art will readily appreciate that the detailed description given herein with respect to these figures is for explanatory purposes as the invention extends beyond these limited embodiments.

Figure 1:
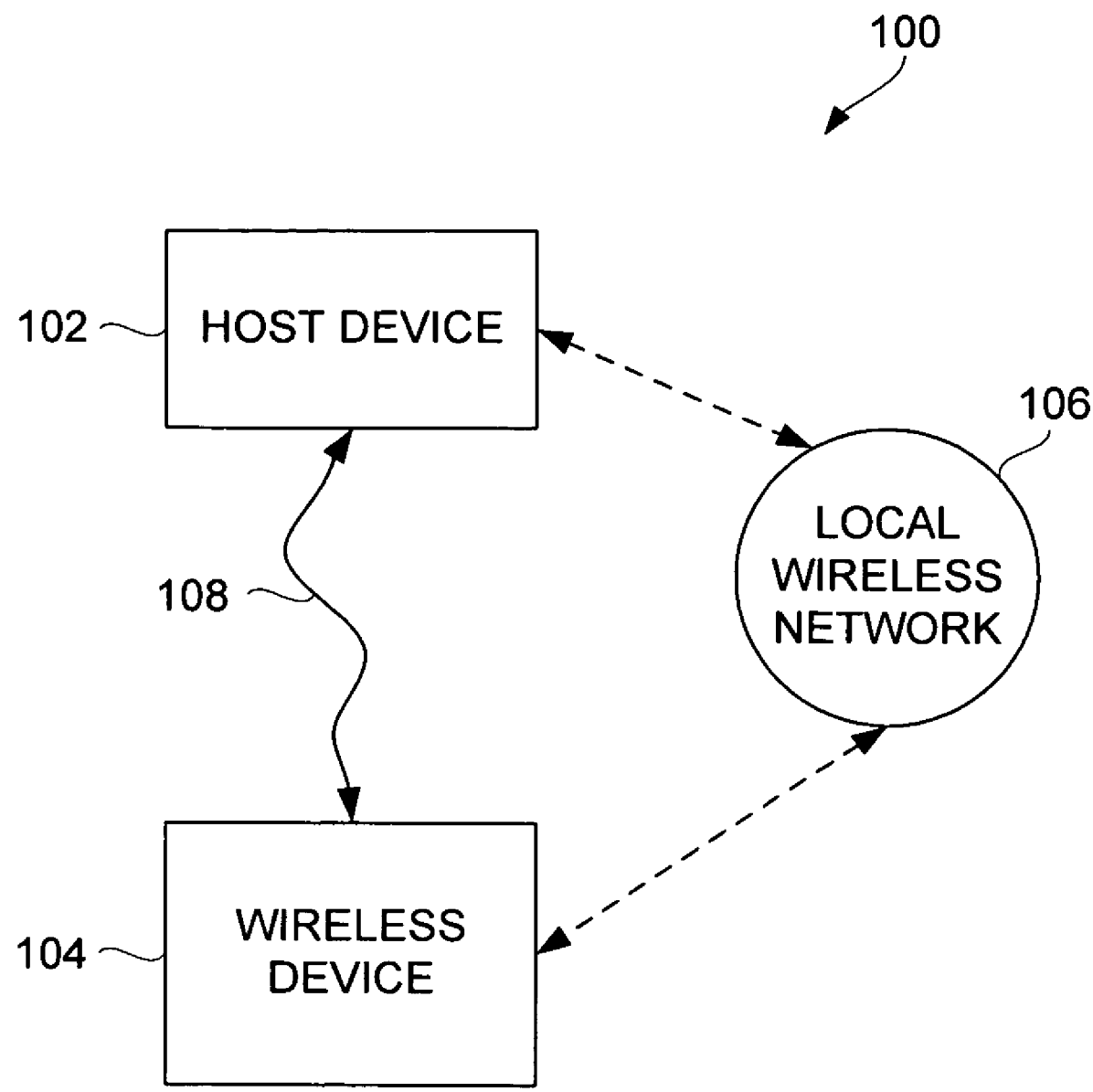
FIG. 1 is a block diagram of a wireless pairing system according to one embodiment of the invention.

FIG. 1 is a block diagram of a wireless pairing system 100 according to one embodiment of the invention. The wireless pairing system 100 includes a host device 102 and a wireless device 104. The host device 102 is an electronic device, such as a personal computer, a mobile communication device, a portable media device, etc. The wireless device 104 is an electronic device that can be used in conjunction with the host device 102. For example, the wireless device 104 can be a peripheral device or an accessory device that augments the capabilities of the host device 102. As a specific example, the wireless device 104, for example, could pertain to a wireless headset that is used in conjunction with the host device 102 that provides media playback (e.g., audio and/or video playback). Typically, the wireless device 104 is coupled to the host device 102 in a wireless manner. That is, the wireless device 104 need not be physically connected with the host device 102. Instead, a wireless link can be facilitated by a local wireless network 106. The wireless link connects the host device 102 to the wireless device 104 via the local wireless network 106. The local wireless network 106 is often referred to as a piconet, which is a short range local wireless network. One example of the local wireless network 106 is a BLUETOOTH network.

In addition, according to the invention, to facilitate pairing of the host device 102 with the wireless device 104, a cable 108 is coupled between the host device 102 and the wireless device 104. Typically, the cable 108 is coupled to the host device 102 and the wireless device 104 during a pairing operation. However, the cable 108 could also couple the host device 102 and the wireless device 104 at other times if so desired. Once paired, however, the host device 102 would typically communicate with the wireless device 104 by way of the local wireless network 106.

According to the invention, the wireless device 104 is able to be paired with the host device 102 without requiring user input of a pin code. In other words, instead of the user of the wireless device 104 being required to enter a pin code, the required pin code can be delivered to the wireless device 104 over the cable 108. As such, the user does not have to remember and enter the appropriate pin code, thus the pairing can be performed in a substantially automated manner that reduces cumbersome and tedious pairing actions that a user would otherwise have to perform. Failed pairing attempts can also be reduced given that user pin code entry errors no longer contribute to failed pairing attempts.

Figure 2:
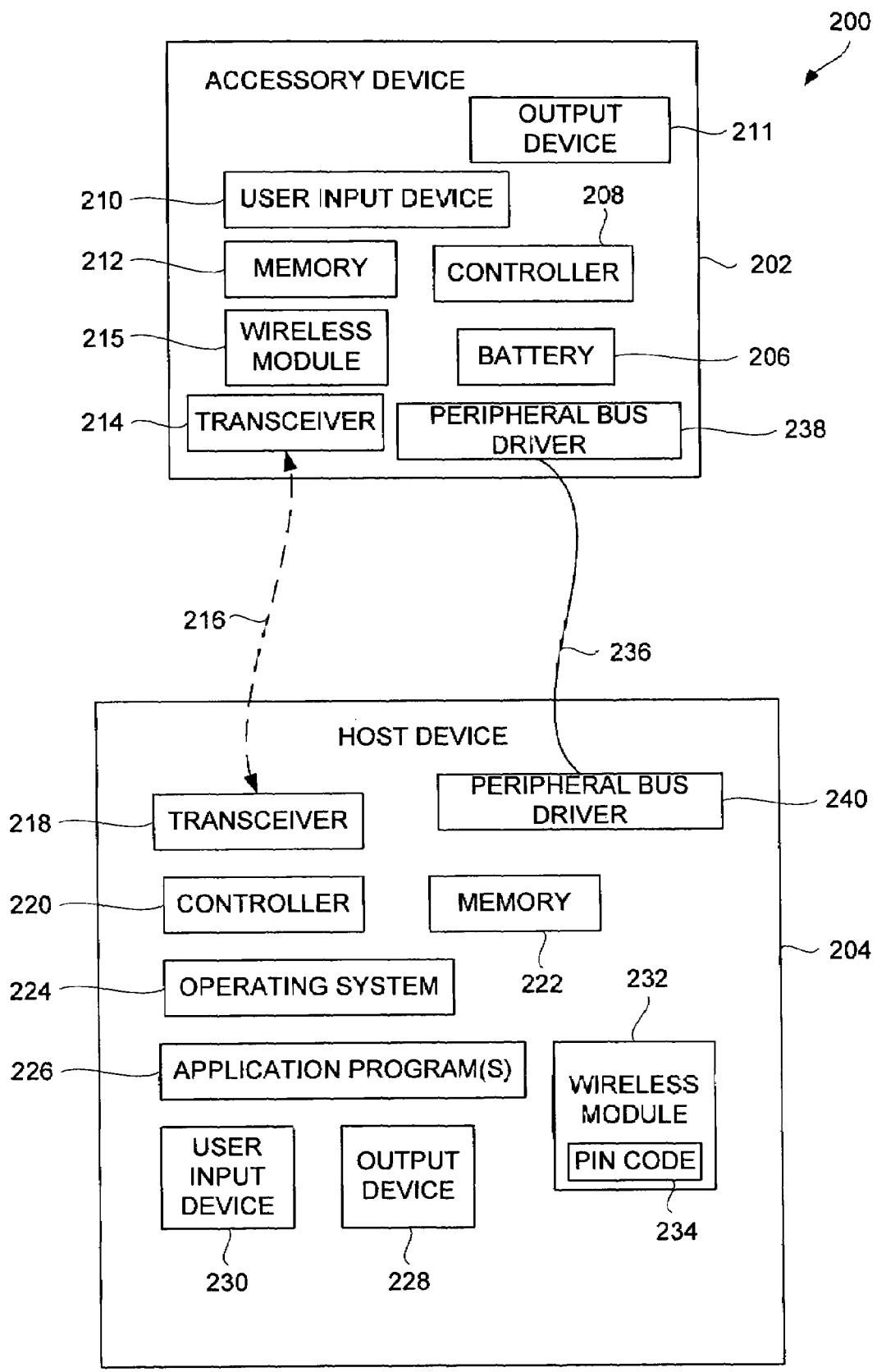
FIG. 2 is a diagram of a wireless system according to one embodiment of the invention.

FIG. 2 is a diagram of a wireless system 200 according to one embodiment of the invention. The wireless system 200 includes an accessory device 202 and a host device 204. As an example, the accessory device 202 can represent the wireless device 104 illustrated in FIG. 1, and the host device 204 can represent the host device 102 illustrated in FIG. 1.

The accessory device 202 is typically a portable device that is powered by a battery 206. The accessory device 202 also includes at least a controller 208, a user input device 210, a user output device 211, and a memory 212. The controller 208 controls the overall operation of the accessory device 202. The user input device 210 enables a user to interact with the accessory device 202. As an example, the user input device 210 can include a button that enables a user to place the accessory device 202 into a pairing mode. The user output device 211 displays information for the user to view. As an example, the user output device 211 can be a display device (e.g., LCD display). The memory 212 provides persistent data storage for various elements, including program code and data. Still further, the accessory device 202 includes a transceiver 214. In one embodiment, the transceiver 214 is a radio-frequency (RF) transceiver. The transceiver 214 can output a wireless transmission 216. Typically, the wireless transmission 216 is directed toward the host device 204.

The host device 204 includes a transceiver 218 for the wireless transmission medium 216 (e.g., wireless link). The host device 204 also includes at least a controller 220, a memory 222, an operating system 224, application program (s) 226, an output device 228, and a user input device 230. The controller 220 controls the overall operation of the host device 204. The memory 222 can be used to store persistent data, including program code (e.g., for the operating system 224 and the application program(s) 226) and data. The operating system 224 together with the controller 220 enables the host device 204 to not only wirelessly receive transmissions from the accessory device 202, but to also support and operate one or more application programs 226 as well as to utilize the output device 228 and the user input device 230.

The host device 204 can also include a wireless module 232. The wireless module 232 can pertain to one or a set of integrated circuits that provide wireless communication functionality. The wireless module 232 is used when communicating over the wireless link 216 to the wireless module 215. In this regard, the wireless module 232 couples to or includes the transceiver 218. In one embodiment, the wireless module 232 can store a pin code (or key) 234 that is used to pair wireless devices.

Besides the wireless link 216, the accessory device 202 and the host device 204 can also communicate over a wired link 236. The wired link 236 can be provided by a cable (which contains one or more wires) connected between the accessory device 202 and the host device 204. The accessory device 202 also includes a peripheral bus driver 238, and the host device 204 also includes a peripheral bus driver 240. The wired link 236 can be established over the cable that connects the peripheral bus driver 238 of the accessory device 202 to the peripheral bus driver 240 of the host device 204.

According to one aspect of the invention, the accessory device 202 can be paired with the host device 204. When paired, the host device 204 is responsive only to the accessory device 202. Hence, if there are other accessory devices in the vicinity of the host device 204, the host device 204 understands to ignore wireless communications from such other accessory devices. In contrast, when unpaired, the host device 204 is responsive to any compatible accessory devices in the vicinity.

Additional details are discussed below for the operations associated with pairing wireless devices (e.g., accessory devices) to host devices. When paired, a user of the accessory device 202 can interact with the one or more application programs 226 operating on the host device 204. For example, one type of application program 226 is a media player program capable of playing digital media assets stored in the memory 222 or some other memory accessible by the host device 204. Hence, the user of the accessory device 202 can interact with the user input device 210 of the accessory device 202 to manipulate media playback controls, such as volume changes, next track, previous track, and play and pause operations associated with the media player program. For other types of application programs 226 available at the host device 204, the particular controls or commands being provided by the accessory device 202 to the host device 204 can vary widely depending upon the application.

Figure 3A:
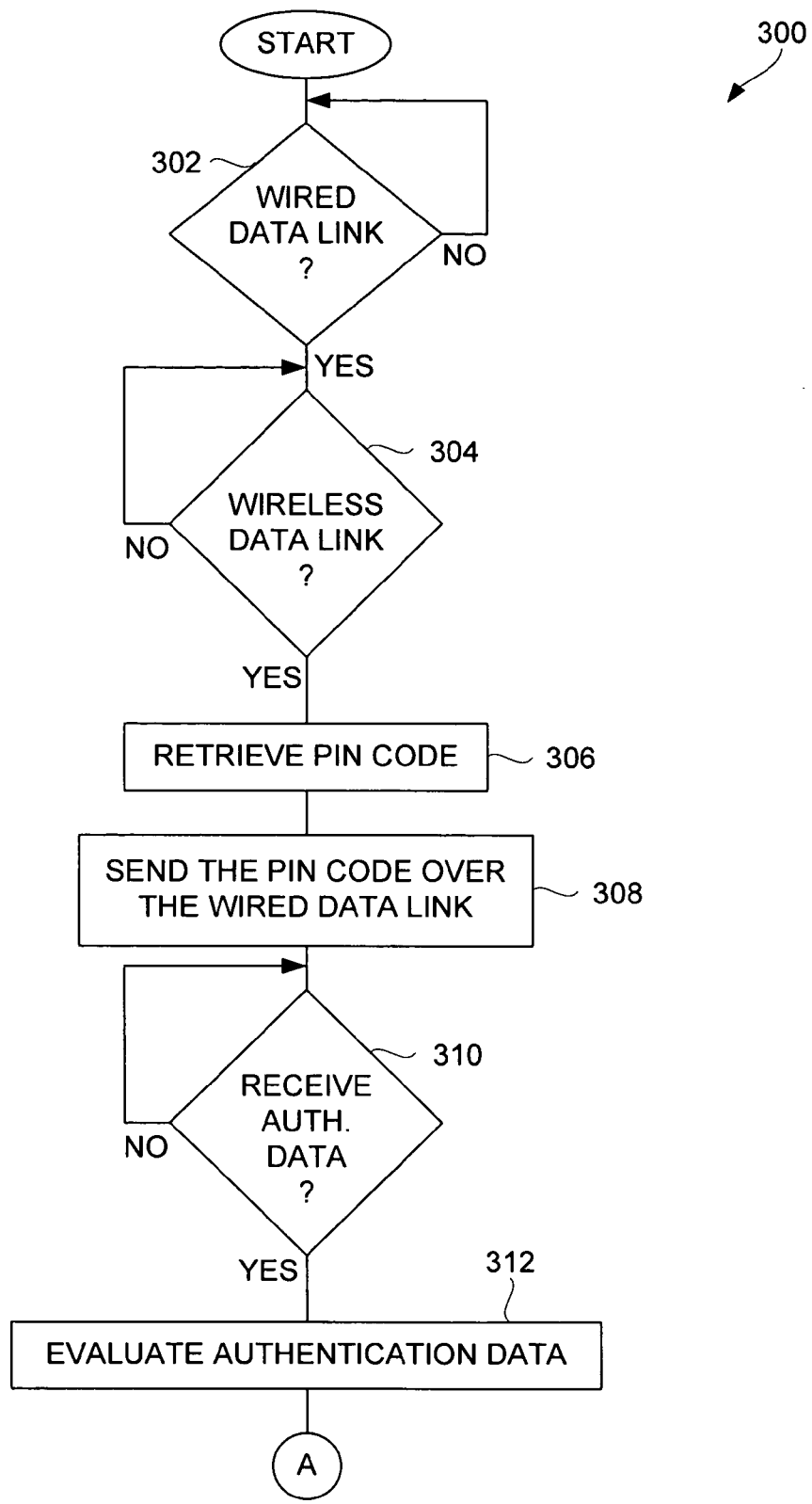
FIGS. 3A and 3B are flow diagrams of a host device pairing process according to one embodiment of the invention.
Figure 3B:
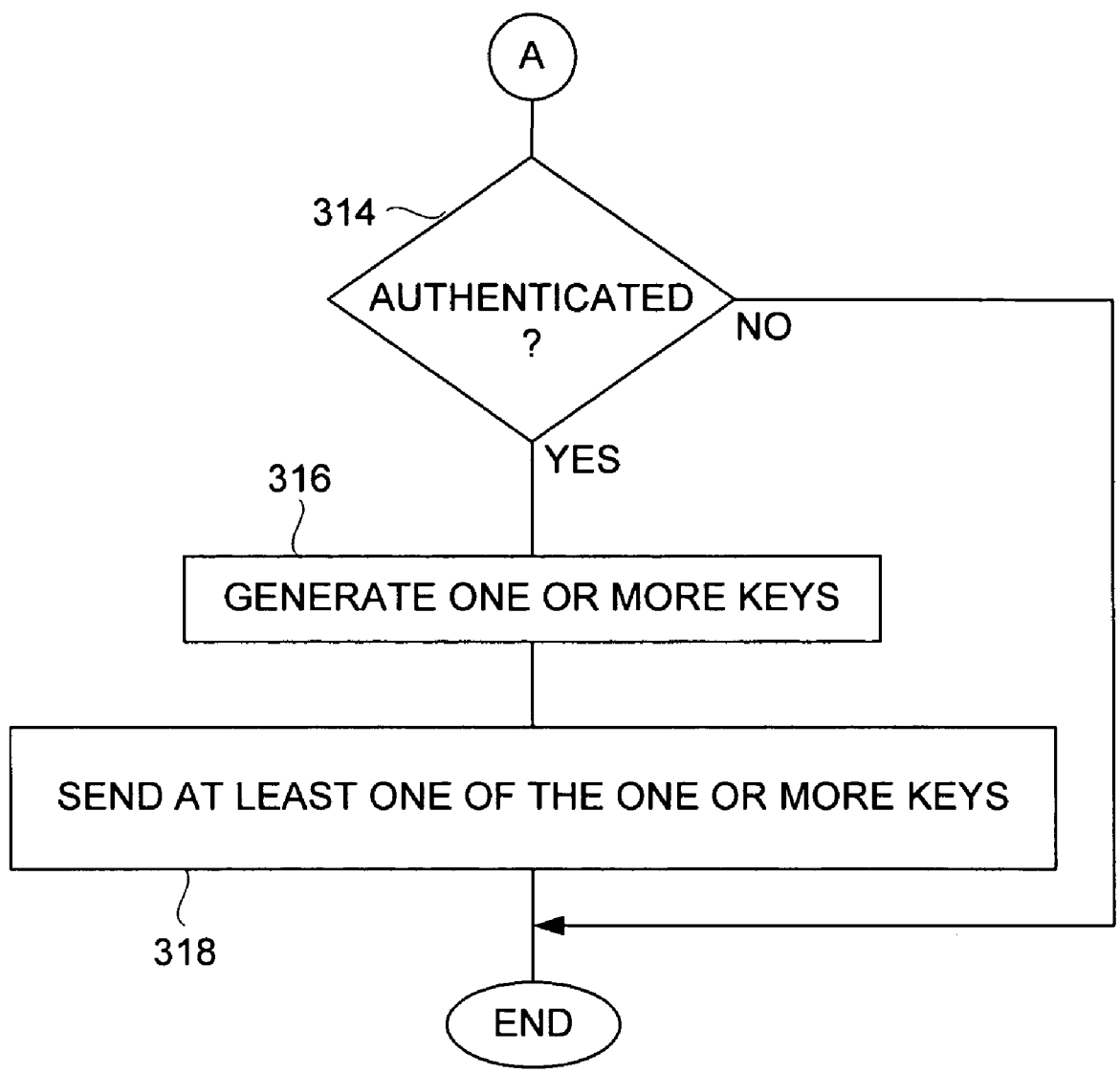

FIGS. 3A and 3B are flow diagrams of a host device pairing process 300 according to one embodiment of the invention. The host device pairing process 300 is, for example, performed by a host device. For example, the host device can, for example, pertain to the host device 102 illustrated in FIG. 1 or the host device 204 illustrated in FIG. 2.

The host device pairing process 300 begins with a decision 302 that determines whether a wired data link exists between a host device and a wireless accessory device. When the decision 302 determines that a wired data link is not present, the host device pairing process 300 awaits the availability of a wired data link. On the other hand, when the decision 302 determines that a wired data link is available, a decision 304 determines whether a wireless data link is available. When the decision 304 determines that a wireless data link is not available, the host device pairing process 300 awaits the availability of a wireless data link. Once the decision 304 determines that a wireless data link is available, then a pairing operation can be performed to pair together the host device and the wireless accessory device. Hence, the following processing assumes that the host device is not already paired with the wireless accessory device. In other words, the host device pairing process 300, or at least the following processing thereof, can be skipped if the host device and the wireless accessory device have already been paired.

In any event, when the host device pairing process 300 continues, a pin code is retrieved 306. Typically, the pin code is retrieved 306 from the host device itself. That is, the pin code is typically a pin code stored in a data storage device internal to the host device. For example, as illustrated in FIG. 2, the pin code 235 can be stored in the wireless module 232. Once the pin code is retrieved 306, the pin code can be sent 308 over the wired data link. Here, the pin code is sent 308 from the host device to the wireless accessory device. Given that the pin code is sent 308 over the wired data link established through physical connection, its transport is relatively secured from unauthorized interception. Optionally, the pin code could be encrypted for further security.

Next, a decision 310 determines whether authentication data has been received. When the decision 310 determines that authentication data has not been received, the host device pairing process 300 awaits such data. Alternatively, when the decision 310 determines that authentication data has been received, the authentication data is evaluated 312. In one embodiment, the authentication data can be received at the host device as part of an authentication response being provided to the host device by the wireless accessory device. Following the evaluation 312 of the authentication data, a decision 314 then determines whether the devices have been authenticated. When the decision 314 determines that the wireless accessory device has been authenticated to the host device, the host device pairing process generates 316 one or more keys. Then, at least one of the one or more keys is sent 318 to the wireless accessory device. Additionally, the at least one of the one or more keys can be stored at the host device. In one embodiment, the one or more keys can be stored in the wireless module 232 of the host device 204. Following the block 318, the host device pairing process 300 ends. Also, following the decision 314 when authentication has not been successfully verified, the host device pairing process 300 ends while bypassing the operations 316 and 318.

Figure 4:
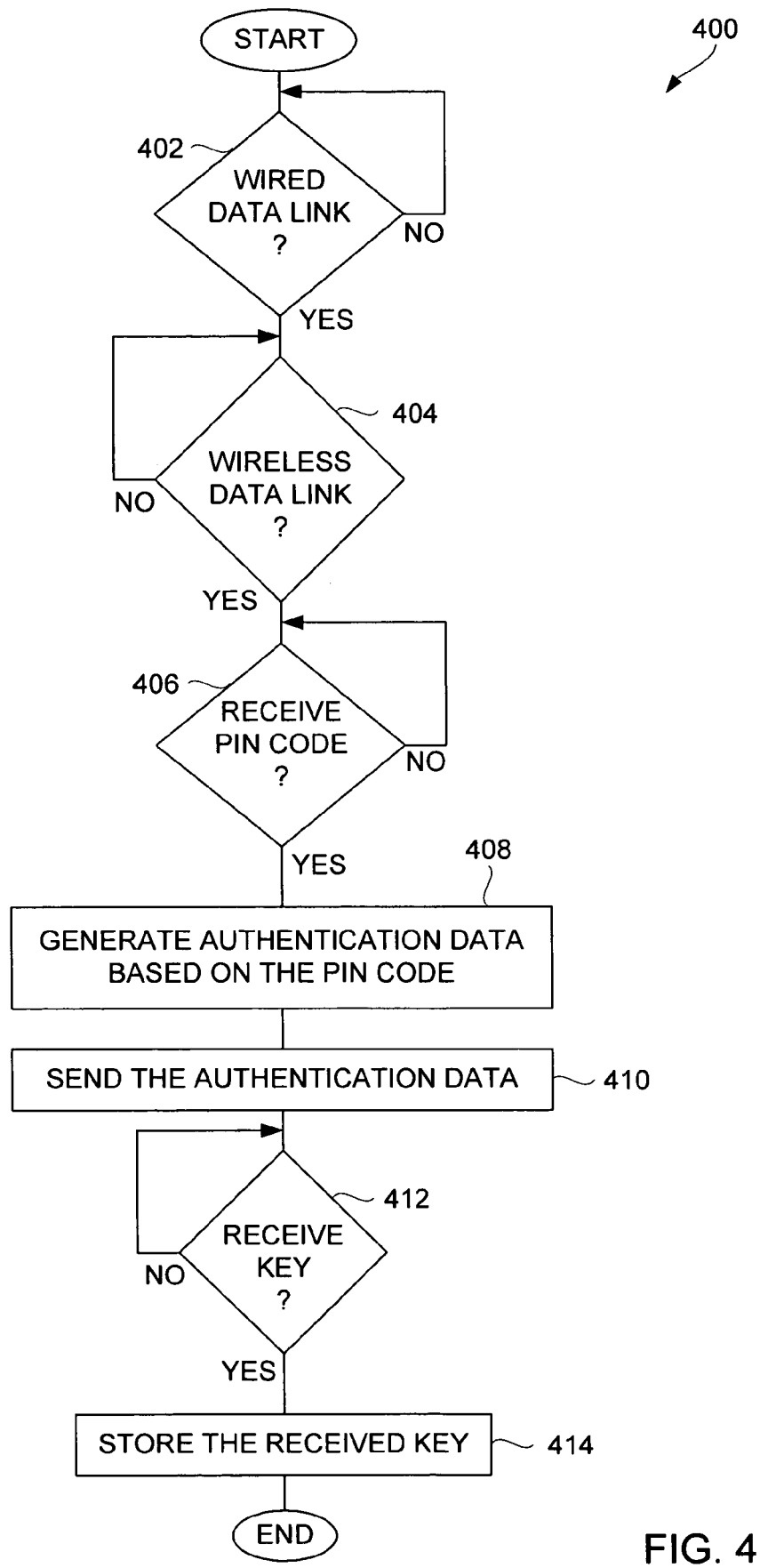
FIG. 4 is a flow diagram of a wireless device pairing process according to one embodiment of the invention.

FIG. 4 is a flow diagram of a wireless device pairing process 400 according to one embodiment of the invention. The wireless device pairing process 400 is, for example, performed by a wireless accessory device. For example, the wireless accessory device can, for example, pertain to the wireless device 104 illustrated in FIG. 1 or the accessory device 202 illustrated in FIG. 2. The wireless device pairing process 400 is complementary process to the host device pairing process 300 illustrated in FIGS. 3A and 3B.

The wireless device pairing process 400 begins with a decision 402 that determines whether a wired data link exists between a host device and a wireless accessory device. When the decision 402 determines that a wired data link is not present, the wireless device pairing process 400 awaits the availability of a wired data link. When the decision 402 determines that a wired data link is present, a decision 404 determines whether a wireless data link is present. When the decision 404 determines that the wireless data link is not present, the wireless device pairing process 400 can await its availability.

Once the decision 404 determines that a wireless data link is available, then a pairing operation can be performed to pair together the host device and the wireless accessory device. Hence, the following processing assumes that the host device is not already paired with the wireless accessory device. In other words, the wireless device pairing process 400, or at least the following processing thereof, can be skipped if the host device and the wireless accessory device have already been paired.

Accordingly, when the decision 404 determines that the wireless data link is available, a decision 406 determines whether a pin code has been received. The pin code is provided to the wireless accessory device over the wired data link according to one embodiment of the invention. As illustrated in FIG. 3A, the block 308 operates to send the pin code to the wireless accessory device over the wired data link. When the decision 406 determines that a pin code has not been received over the wired data link, the wireless device pairing process 400 can await the pin code. After a period of time, the waiting could cease and a user could enter the required pin code or the wireless pairing process 400 could end.

In any case, once the decision 406 determines that a pin code has been received over the wired data link, authentication data is generated 408 at the wireless accessory device based on the pin code. The authentication data is then sent 410 to the host device. In one embodiment, the authentication data is sent to the host device over the wireless data link. However, in an alternative embodiment, the authentication data could be sent over the wired data link. In any case, after the authentication data has been sent 410, a decision 412 determines whether a key has been received from the host device. Here, assuming that the host device determines that the wireless accessory device is indeed authenticated, pairing can be completed by storing keys at the wireless device as well as at the host device. In one embodiment, these keys can be referred to as link keys, in accordance with BLUETOOTH short range local wireless network protocol. Hence, the decision 412 determines whether a key has been received. When the decision 412 determines that a key has not yet been received, the wireless device pairing process 400 awaits receipt of a key. Once the decision 412 determines that a key has been received, the received key is stored 414 at the wireless device. The received key is then subsequently used to authenticate the wireless device to the host device prior to the transfer of data between the wireless device and the host device. The wireless device and the host device have thus been successfully paired and are able to exchange data over the wireless data link. Following the block 414, the wireless device pairing process 400 ends.

Figure 5:
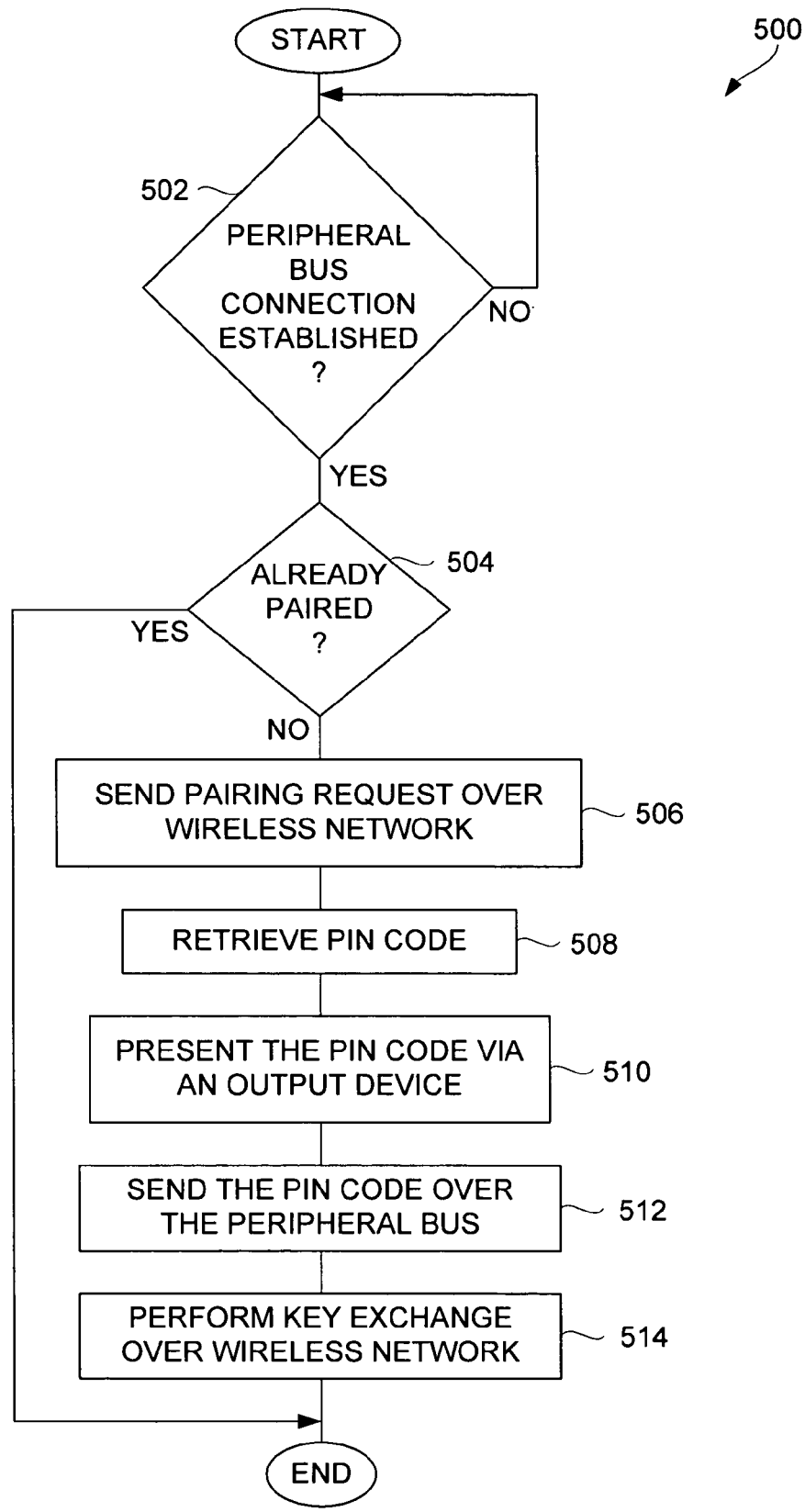
FIG. 5 is a flow diagram of a host pairing process according to one embodiment of the invention.

FIG. 5 is a flow diagram of a host pairing process 500 according to one embodiment of the invention. The host pairing process 500 is, for example, performed by a host device, such as the host device 102 illustrated in FIG. 1 or the host device 204 illustrated in FIG. 2.

The host pairing process 500 begins with a decision 502 that determines whether a peripheral bus connection has been established between the host device and the wireless accessory device. The peripheral bus connection is a wired connection and examples of which are Universal Serial Bus (USB) and Firewire. When the decision 502 determines that a peripheral bus connection has not been established, the host pairing process 500 can await the presence of a peripheral bus connection. In one implementation, the host pairing process 500 could be initiated automatically when a peripheral bus connection is established between the host device and a wireless accessory device.

In any event, once the decision 502 determines that a peripheral bus connection has been established, a decision 504 determines whether the host device has already been paired to the wireless accessory device. When the decision 504 determines that the host device is already paired to the wireless accessory device, the host pairing process 500 ends since pairing processing is not required. On the other hand, when the decision 504 determines that the host device is not already paired with the wireless accessory device, a pairing request is sent 506 over the wireless network from the host device to the wireless accessory device. A pin code is also retrieved 508. The pin code is retrieved 508 from the host device itself. For example, the host device can include a wireless module (e.g., wireless module 232) that stores within the wireless module at least one pin code. The pin code can be presented 510 via an output device associated with the host device. Here, the pin code can be presented 510 (e.g., displayed) on the output device of the host device. The pin code is also sent 512 to the wireless accessory device over the peripheral bus. Thereafter, assuming that the host device is able to authenticate the accessory device through use of the pin code, key exchange is performed 514 over the wireless network. The key exchange means that the host device will store at least one key (e.g., link key) that will be used to exchange data with the wireless accessory device via the wireless network. However, prior to or part of the key exchange, the host device first authenticates the accessory device. The authentication is dependent on the proper pin code being available at the wireless accessory device. Following the block 514, the host pairing process 500 ends with the host device being successfully paired with the wireless device.

Figure 6:
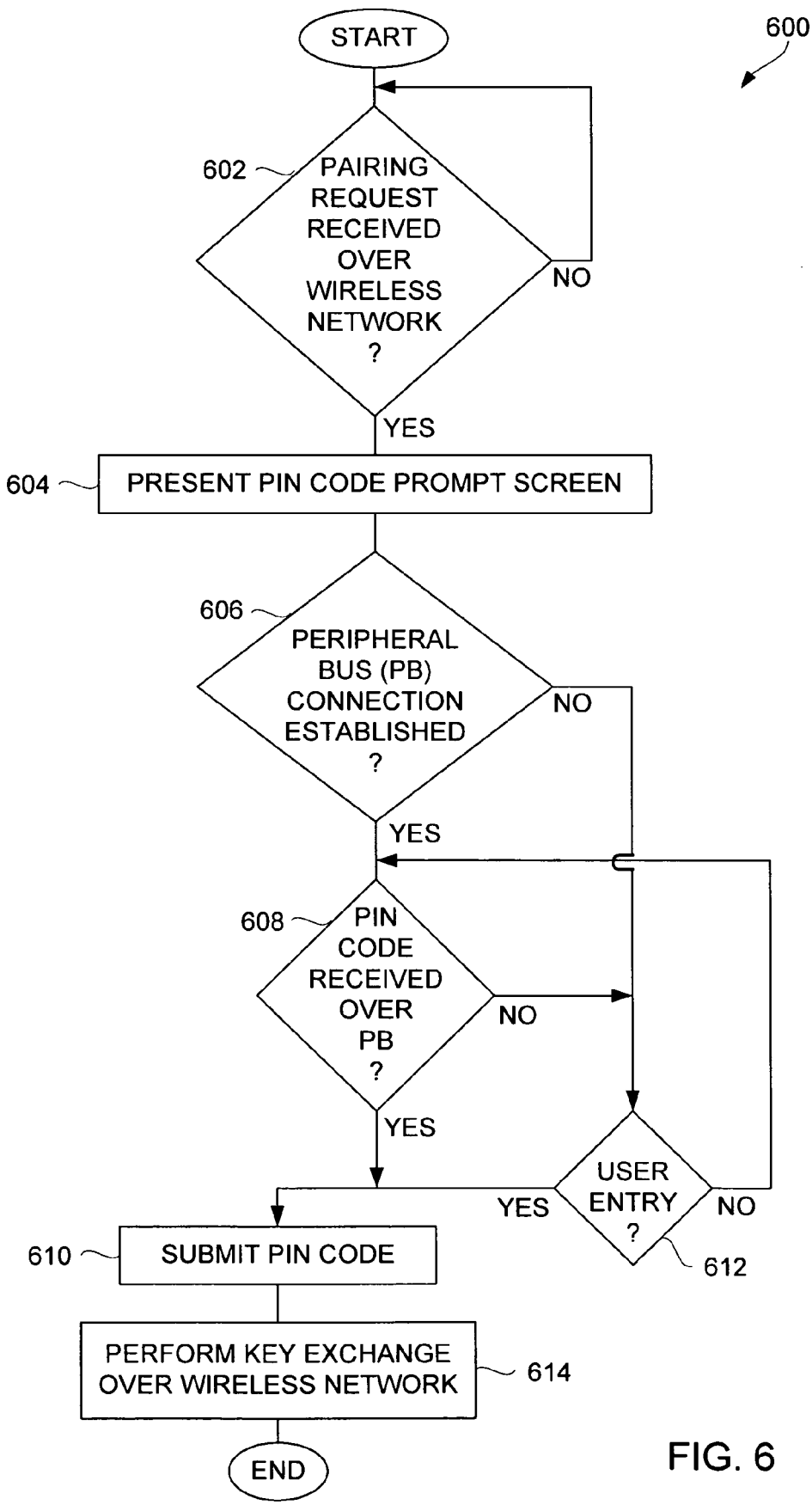
FIG. 6 is a flow diagram of an accessory pairing process according to one embodiment of the invention.

FIG. 6 is a flow diagram of an accessory pairing process 600 according to one embodiment of the invention. The accessory pairing process 600 is, for example, performed by a wireless accessory device, such as the wireless device 104 illustrated in FIG. 1 or the accessory device 202 illustrated in FIG. 2. The accessory pairing process 600 is complementary process to the host device pairing process 500 illustrated in FIG. 5.

The accessory pairing process 600 begins with a decision 602 that determines whether a pairing request has been received over the wireless network. When the decision 602 determines that a pairing request has not been received, the accessory pairing process 600 awaits such a request. Alternatively, when the decision 602 determines that a pairing request has been received over the wireless network, the accessory pairing process 600 continues. In other words, in this embodiment, the accessory pairing process 600 is effectively invoked upon receipt of a pairing request.

When the accessory pairing process 600 continues, a pin code prompt screen is presented 604. Typically, in a conventional fashion, a user would enter a pin code into the prompt screen. However, the pin code is able to be provided automatically (i.e., without user input) according to the invention. In this regard, a decision 606 determines whether a peripheral bus (PB) connection has been established between the wireless accessory device and the host device. When the decision 606 determines that a peripheral bus connection has been established, a decision 608 determines whether a pin code has been received from the host device over the peripheral bus. When the decision 608 determines that the pin code has been received over the peripheral bus, then the pin code can be submitted 610. For example, the pin code can be automatically entered into the pin code prompt screen and then submitted. In this manner, instead of the user being burdened to enter the unknown pin code, the pin code can be automatically delivered to the wireless accessory device and submitted without the user having to enter it. However, when the decision 606 determines that the peripheral bus connection is not established, or when the decision 608 determines that the pin code has not been received over the peripheral bus, a decision 612 can determine whether a user has entered the pin code. For example, the user can be permitted to enter the pin code using the pin code prompt screen. When the decision 612 determines that the user has not entered a pin code, the accessory pairing process 600 returns to repeat the decision 608 so that the pin code can potentially still be delivered to the wireless accessory device by way of the peripheral bus.

Alternatively, when the decision 612 determines that the user has entered a pin code, the pin code can be submitted 610. Accordingly, although the improvement offered by the invention is the delivery of the pin code to the wireless accessory device over a data link, namely, a wired data link, one embodiment can still permit a user to enter the pin code in the event that the pin code is not delivered over a data link. In any event, after the pin code has been submitted 610, key exchange can be performed 614 between the host device and the wireless accessory device over the wireless network. In this regard, the pairing operation has been successfully performed and the key exchange permits the paired devices to thereafter be authenticated so that data transfer can be performed between the paired devices. Following the block 614, the accessory pairing process 600 ends.

According to one embodiment, when a wireless device connects with a host device by way of a wireless network and a wired medium, pairing can be performed. When the connection via the wired medium is made, not only can a pin code be transferred but other data or energy (e.g., for power and/or charging a battery) can also be transferred via the wired medium. In other words, the wired medium can serve various purposes, only one of which is assisting with pairing operations.

Assuming that pairing has been successful between a wireless host device and a wireless accessory device, thereafter, data transfer can be performed between the wireless host device and the wireless accessory device in a secured and controlled manner through use of a key (e.g., link key) that was established during the pairing operation.

Figure 7:
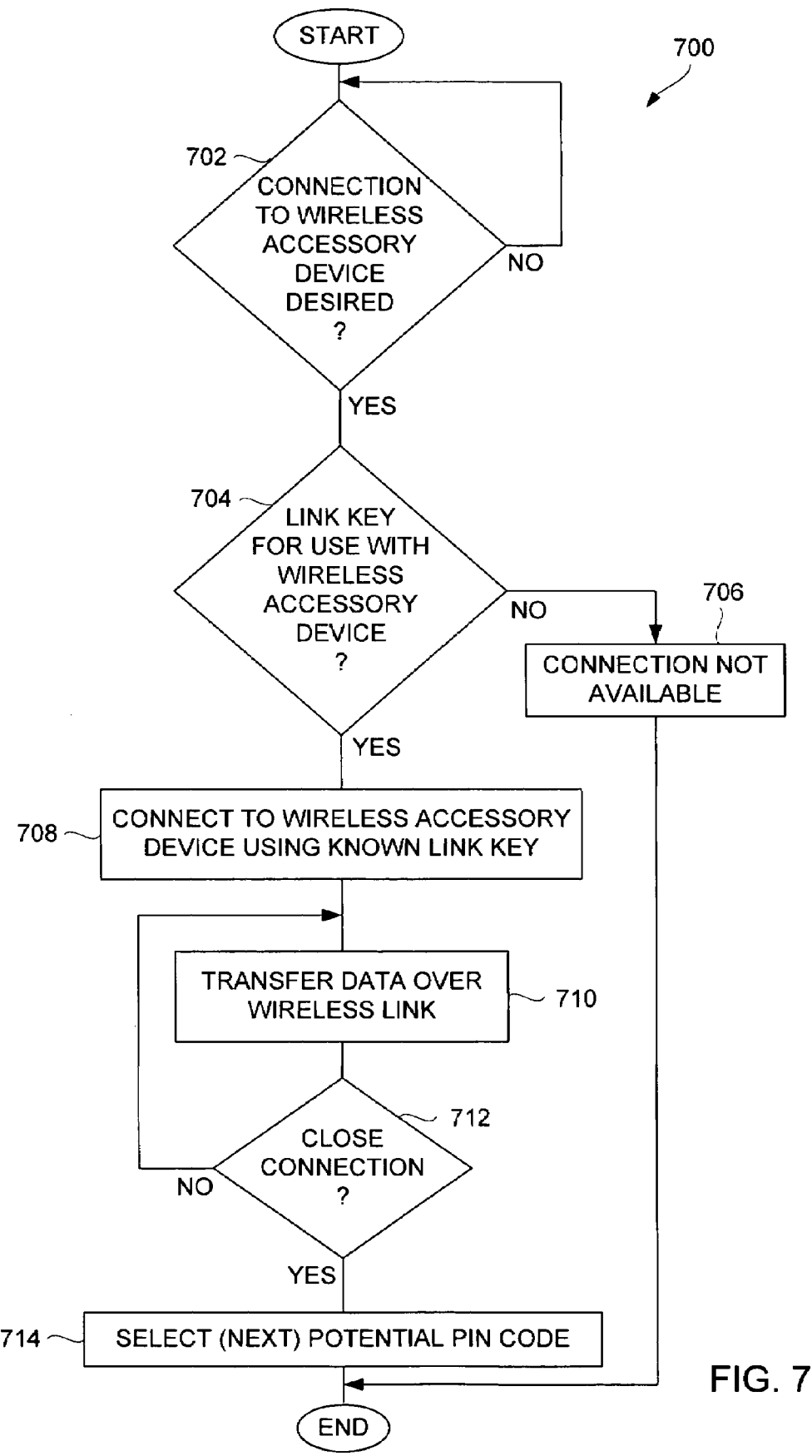
FIG. 7 is a flow diagram of wireless data transfer between a wireless host device and a wireless accessory device that have been successfully paired.

FIG. 7 is a flow diagram of wireless data transfer between a wireless host device and a wireless accessory device that have been successfully paired.

The wireless data transfer process 700 begins with a decision 702 that determines whether a connection to the wireless accessory device is desired. When the decision 702 determines that a connection from the wireless host device to the wireless accessory device is not desired, then the wireless data transfer process 700 is effectively not invoked. Alternatively, when the decision 702 determines that a connection between the wireless host device and the wireless accessory device is desired, the wireless data transfer process 700 is effectively invoked. In such case, a decision 702 determines whether the wireless host device has a link key for use with the wireless accessory device. When the wireless host device does not have such a link key, the desired connection is not available 706. Typically, in this case, the wireless host device has not been successfully paired with the wireless accessory device and thus does not have a link key that facilitates data transfer with the wireless accessory device.

On the other hand, when the decision 704 determines that the wireless host device does have an appropriate link key for use with the wireless accessory device, the wireless host device connects 708 to the wireless accessory device using the known link key. With the connection being established, data can then be transmitted over a wireless link provided by the connection between the wireless host device and the wireless accessory device. Next, a decision 712 determines whether the connection is to be closed. When the decision 712 determines that the connection is not to be closed, data transfer over the wireless link can continue to be transferred 710. As an example, the wireless accessory device can be a headset and the wireless host device can be a media player or mobile phone. In either case, the user can use the headset to exchange data with the media player or mobile phone in a wireless manner. Alternatively, when the decision 712 determines that the connection should be closed, the connection is then closed 714. Following the block 714, as well as following the block 706, the wireless data transfer process 700 ends.

Although various embodiments discussed above use a wireless accessory device as one of the wireless devices being paired, the invention is not limited to wireless accessory devices. A wireless accessory device is a wireless device that can be used in conjunction with a host device through wireless means. The invention is, however, applicable to pairing wireless devices in general. Hence, neither of a pair of wireless devices being paired is necessarily an accessory device.

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that wireless devices can be paired without any need for a user enter a pin code that is often not readily available to the user. In other words, pairing of wireless devices can be achieved in a substantially automated manner. Another advantage of the invention is that a required pin code for pairing a pair of wireless devices can be transferred between the wireless devices over a wired medium that offers physical security for the pin code being transferred.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for pairing a host device with a wireless device, said method comprising:
   at the host device;
   detecting a wired data link between the host device and the wireless device;
   establishing a wireless data link between the host device and the wireless device;
   retrieving a pin code internal to the host device;

sending the pin code to the wireless device over the wired data link;

receiving authentication data from the wireless device;

presenting the pin code, after said receiving, on an output device of the host device;

authenticating the wireless device based on the received authentication data; and completing pairing of the host device with the wireless device when the wireless device has been authenticated.

2. A method as recited in claim 1, wherein completing pairing comprises:

generating one or more keys when the wireless device has been authenticated; and sending at least one of the one or more keys from the host device to the wireless device when the pairing is successful.

3. A method as recited in claim 2, wherein said receiving of the authentication data is over the wireless data link.

4. A method as recited in claim 2, wherein said sending of the at least one of the one or more keys is over the wireless data link.

5. A method as recited in claim 2, wherein said sending of the at least one of the one or more keys is over the wired data link.

6. A method as recited in claim 2, wherein the one or more keys include a link key or a key derived from the link key.

7. A method as recited in claim 1, wherein said receiving of the authentication data is over the wired data link.

8. A method as recited in claim 1, wherein said method further comprises:

receiving at least one key from the wireless device when the pairing is successful.

9. A method as recited in claim 1, wherein said authenticating operates to authenticate the received authentication data based on the pin code.

10. A method as recited in claim 1, wherein the host device operates at least one application program that makes use of a user interface, and wherein said method further comprises:

intercepting, prior to said sending, the pin code via the application program or the user interface.

11. A method as recited in claim 1, wherein the host device operates at least one application program, wherein the host device also includes a wireless module that participates in at least pairing and data transfer, and wherein the at least one application interacts with the wireless module during pairing or data transfer.

12. A method as recited in claim 1, wherein the pin code is presented using a pin code notification screen.

13. A method as recited in claim 1, wherein the wired data link is provided over a cable.

14. A method as recited in claim 1, wherein the wired data link is provided over a wired medium that physically provides one or more electrical connections.

15. A method as recited in claim 1, wherein the wired data link is provided via a peripheral bus.

16. A method as recited in claim 15, wherein the peripheral bus is a USB or Firewire bus.

17. A method as recited in claim 1, wherein the wireless data link is over a local wireless network in accordance with the BLUETOOTH short range local wireless network protocol.

18. A host computing device with support for a wired data link and a wireless data link, said device comprising:

a connection manager configured to detect a wired data link between the host computing device and a wireless device;

a wireless transceiver for transferring data between the host computing device and the wireless device over a wireless data link;

an output device configured to present a pin code;

a pairing manager operatively connected to said connection manager and said wireless transceiver, said pairing manager manages pairing of the host computing device and the wireless device, and said pairing manager operable to: (i) retrieve a pin code internal to the host computing device, (ii) send the pin code to the wireless device over the wired data link, iii receive authentication data from the wireless device, (iv) present, after receiving the authentication data, the pin code on the output device, (v) authenticate the wireless device based on the received authentication data; and (vi) complete pairing of the host device with the wireless device when the wireless device has been authenticated.

19. A host computing device as recited in claim 18, wherein the received authentication data is dependent on the pin code that was sent to the wireless device over the wired data link.

20. A host computing device as recited in claim 18, wherein said pairing manager is further operable to (vii) generate one or more keys when the wireless device has been authenticated, and (viii) send at least one of the one or more keys from the host device to the wireless device when the pairing is successful.

21. A host computing device as recited in claim 18, wherein said connection manager comprises a peripheral bus driver for detecting the wired data link between the host computing device and the wireless device.

22. A host computing device as recited in claim 18, wherein said host computing device is a personal computer.

* * * * *

UNITED STATES PATENT AND TRADEMARK OFFICE
CERTIFICATE OF CORRECTION

| | | |
|---|---|---|
| PATENT NO. | : 7,913,297 B2 | Page 1 of 1 |
| APPLICATION NO. | : 11/513692 | |
| DATED | : March 22, 2011 | |
| INVENTOR(S) | : Jeremy Wyld | |

It is certified that error appears in the above-identified patent and that said Letters Patent is hereby corrected as shown below:

On page 4, in column 2, under "Other Publications", line 15, delete "Torn" and insert -- Tom --, therefor.

On page 4, in column 2, under "Other Publications", line 18, delete ".lcdharware." and insert -- .lcdhardware. --, therefor.

On page 5, in column 2, under "Other Publications", line 52, delete "Pervasice" and insert -- Pervasive --, therefor.

On page 6, in column 1, under "Other Publications", line 14, delete ".corn/" and insert -- .com/ --, therefor.

On page 8, in column 1, under "Other Publications", line 19, delete "sensormag." and insert -- sensorsmag. --, therefor.

In column 11, line 11, in claim 2, after "wherein" insert -- said --.

In column 12, line 29, in claim 18, delete "iii" and insert -- (iii) --, therefor.

Signed and Sealed this
Twenty-ninth Day of November, 2011

David J. Kappos
*Director of the United States Patent and Trademark Office*